US011593648B2

(12) United States Patent
Lee et al.

(10) Patent No.: US 11,593,648 B2
(45) Date of Patent: Feb. 28, 2023

(54) METHODS AND SYSTEMS FOR DETECTION AND ISOLATION OF BIAS IN PREDICTIVE MODELS

(71) Applicant: Adobe Inc., San Jose, CA (US)

(72) Inventors: Sana Lee, Cupertino, CA (US); Po Ming Law, Atlanta, GA (US); Moumita Sinha, Cupertino, CA (US); Fan Du, Milpitas, CA (US)

(73) Assignee: Adobe Inc., San Jose, CA (US)

( * ) Notice: Subject to any disclaimer, the term of this patent is extended or adjusted under 35 U.S.C. 154(b) by 404 days.

(21) Appl. No.: 16/844,006

(22) Filed: Apr. 9, 2020

(65) Prior Publication Data
US 2021/0319333 A1   Oct. 14, 2021

(51) Int. Cl.
*G06N 3/08*   (2006.01)
*G06N 20/00*   (2019.01)

(52) U.S. Cl.
CPC .............. *G06N 3/08* (2013.01); *G06N 20/00* (2019.01)

(58) Field of Classification Search
CPC ........... G06N 3/08; G06N 20/00; G06N 20/20
See application file for complete search history.

(56) References Cited

U.S. PATENT DOCUMENTS

| 8,291,069 B1 | 10/2012 | Phillips |
| 9,285,973 B1 | 3/2016 | Gable |
| 9,785,973 B2 * | 10/2017 | Tollinger ........... G06Q 30/0242 |
| 10,878,448 B1 * | 12/2020 | Chu ................... G06Q 30/0275 |
| 10,997,244 B2 * | 5/2021 | Russell ................... G06F 21/56 |
| 11,181,634 B1 * | 11/2021 | Lue .......................... G06N 3/08 |
| 2008/0059260 A1 | 3/2008 | Jeffrey |
| 2008/0097835 A1 | 4/2008 | Weiser |
| 2012/0278097 A1 * | 11/2012 | Ghouri ................... G16H 70/60 705/2 |
| 2013/0046613 A1 | 2/2013 | Farahat et al. |
| 2013/0339091 A1 | 12/2013 | Humay |
| 2014/0278912 A1 * | 9/2014 | Hughes .............. G06Q 30/0242 705/14.71 |
| 2015/0106170 A1 | 4/2015 | Bonica |
| 2015/0244820 A1 | 8/2015 | Verkasalo et al. |
| 2016/0086205 A1 | 3/2016 | Dove et al. |
| 2016/0170594 A1 | 6/2016 | Rosenberg |
| 2020/0082299 A1 | 3/2020 | Vasconcelos |
| 2020/0125928 A1 * | 4/2020 | Doyle .................. G06N 3/0445 |

(Continued)

OTHER PUBLICATIONS

U.S. Appl. No. 16/411,515, Jan. 14, 2021, Office Action.

(Continued)

*Primary Examiner* — Mia M Thomas
(74) *Attorney, Agent, or Firm* — Keller Preece PLLC

(57) ABSTRACT

This disclosure involves detecting biases in predictive models and the root cause of those biases. For example, a processing device receives test data and training data from a client device. The processing device identifies feature groups from the training data and the test data generates performance metrics and baseline metrics for a feature group. The processing device detects biases through a comparison of the performance metrics and the baseline metrics the feature group. The processing device then isolates a portion of the training data that corresponds to the detected bias. The processing device generates a model correction usable to remove the bias from the predictive model.

20 Claims, 10 Drawing Sheets

(56) References Cited

U.S. PATENT DOCUMENTS

| | | | |
|---|---|---|---|
| 2020/0134493 A1* | 4/2020 | Bhide | G06N 5/048 |
| 2020/0250561 A1 | 8/2020 | Restrepo et al. | |
| 2020/0364245 A1* | 11/2020 | Sinha | G06F 16/355 |
| 2020/0372036 A1 | 11/2020 | Mitra et al. | |
| 2021/0373103 A1* | 12/2021 | Leussler | G01R 33/36 |
| 2022/0101136 A1* | 3/2022 | Wood | G06N 3/04 |
| 2022/0121885 A1* | 4/2022 | Chalamalasetti | G06V 10/774 |

OTHER PUBLICATIONS

A Comprehensive Set of Fairness Metrics for Datasets and Machine Learning Models, Explanations for These Metrics, and Algorithms to Mitigate Bias in Datasets and Models, IBM/AIF360, Available Online: https://github.com/IBM/AIF360, 5 pages.

IBM HR Analytics Employee Attrition & Performance, Kaggle, Available Online at: https://www.kaggle.com/pavansubhasht/ibm-hr-analytics-attrition-dataset 2017, accessed Jun. 14, 2020, 2 pages.

The R Project for Statistical Computing, Available Online at: https://www.r-project.org, Mar. 11, 2019, 2 pages.

Abdul et al., Trends and Trajectories for Explainable, Accountable and Intelligible Systems: An HCI Research Agenda, Proceedings of the CHI Conference on Human Factors in Computing Systems, Available Online at: http://dx.doi.org/10.1145/3173574.3174156, Apr. 21-26, 2018, pp. 1-18.

Ackerman, The Intellectual Challenge of CSCW: The Gap Between Social Requirements and Technical Feasibility, Human-Computer Interaction, vol. 15, No. 2-3, pp. 179-203, Sep. 2000, pp. 179-20.

Adebayo, FairML: ToolBox for Diagnosing Bias in Predictive Modeling, Computer Science, Jun. 2016, pp. 1-9.

Ali et al., Loss-Aversively Fair Classification, Proceedings of the AAAI/ACM Conference on AI, Ethics, and Society, Jan. 27-28, 2019, pp. 211-218.

Amershi et al., ModelTracker: Redesigning Performance Analysis Tools for Machine Learning, Proceedings of the 33rd Annual ACM Conference on Human Factors in Computing Systems, Available online at: https://dl.acm.org/citation.cfm?doid=2702123.2702509, Apr. 18-23, 2015, pp. 337-346.

Amershi et al., Power to the People: The Role of Humans in Interactive Machine Learning, AI Magazine, vol. 35, No. 4, Dec. 22, 2014, pp. 105-120.

Angell et al. Themis: Automatically Testing Software for Discrimination, Proceedings of the 26th ACM Joint Meeting on European Software Engineering Conference and Symposium on the Foundations of Software Engineering, Available Online at: http://dx.doi.org/10.1145/3236024.3264590, Oct. 2018, pp. 871-875.

Angwin et al., Machine Bias, Available Online at: https://www.propublica.org/article/machine-bias-risk-assessments-in-criminal-sentencing, May 23, 2016, 10 pages.

Barocas et al., A Tutorial on Fairness in Machine Learning, NIPS, Available Online at: https://vimeo.com/248490141, Dec. 2017.

Barocas et al. Big Data's Disparate Impact, California Law Review, vol. 104, 2016, pp. 671-732.

Beales The Value of Behavioral Targeting, Network Advertising Initiative, Online Available: https://www.networkadvertising.org/pdfs/Beales_NAI_Study.pdf, 2018, 25 pages.

Bellamy et al., AI Fairness 360: an Extensible Toolkit for Detecting, Understanding, and Mitigating Unwanted Algorithmic Bias, IBM Journal of Research and Development, Available online at: https://arxiv.org/abs/1810.01943, Oct. 2018, 20 pages.

Binns, Fairness in Machine Learning: Lessons from Political Philosophy, Proceedings of Machine Learning Research, vol. 81, Available Online at: http://proceedings.mlr.press/v81/binns18a, 2018, pp. 1-11.

Brown et al., Toward Algorithmic Accountability in Public Services, Proceedings of the CHI Conference on Human Factors in Computing Systems, vol. 41, Available Online at: http://dx.doi.org/10.1145/3290605.330Q271, May 4-9, 2019, pp. 1-12.

Buolamwini et al., Gender Shades: Intersectional Accuracy Disparities in Commercial Gender Classification, Proceedings of Machine Learning Research, vol. 81, Available Online at: http://proceedings.mlr.press/v81/buolamwinila, 2018, pp. 1-15.

Cabrera et al., FairVis: Visual Analytics for Discovering Intersectional Bias in Machine Learning, Available Online at: https://arxiv.org/abs/1904.05419, 2019, 11 pages.

Chen et al., Can AI Help Reduce Disparities in General Medical and Mental Health Care?, AMA Journal of Ethics, vol. 21, No. 2, Available Online at: http://dx.doi.org/10.1001/amajethics.2019.167, Feb. 2019, pp. 167-179.

Chung et al., Automated Data Slicing for Model Validation: A Big data—AI Integration Approach, Available Online at: http://dx.doi.org/10.1109/TKDE.2019.2916074, May 14, 2019, pp. 1-13.

Corbett-Davies et al., The Measure and Mismeasure of Fairness: A Critical Review of Fair Machine Learning, Computers and Society, vol. 11, Available at Online: https://arxiv.org/abs/1808.00023, Sep. 11, 2018, pp. 1-25.

Crawford, Artificial Intelligence—with Very Real Biases, Available Online at: https://www.wsj.com/articles/artificial-intelligencewith-very-real-biases-1508252717, Oct. 17, 2017, 13 pages.

Dam, Searching for images of CEOs or managers? The results almost always show men, The Washington Post, Available Online at: https://www.washingtonpost.com/business/2019/01/03/searching-images-ceos-or-managers-results-almost-always-show-men/?noredirect=on, Jan. 3, 2019, 4 pages.

Danks et al., Algorithmic Bias in Autonomous Systems, Proceedings of the 26th International Joint Conference on Artificial Intelligence, Available Online at: https://dl.acm.org/citation.cfm?id=3171944, Aug. 2017, pp. 4691-4697.

Davenport et al., Competing on Talent Analytics Harvard Business Review, Available Online at: https://hbr.org/2010/10/competing-on-talent-analytics, Oct. 2010, pp. 52-58.

Dietterich et al., Machine Learning Bias, Statistical Bias, and Statistical Variance of Decision Tree Algorithms, Computer Science, Available Online at: http://citeseerx.ist.psu.edu/viewdoc/summary?doi=10.1.1.38.2702, 1995, 14 pages.

Doshi-Velez et al., Towards a Rigorous Science of Interpretable Machine Learning, Available online at: https://arxiv.org/pdf/1702.08608.pdf, Mar. 2, 2017, pp. 1-13.

Dressel et al. The Accuracy, Fairness, and Limits of Predicting Recidivism, Science Advances, vol. 4, No. 1, eaao5580, Available Online at: http://dx.doi.org/10.1126/sciadv.aao5580, Jan. 17, 2018, pp. 1-5.

Dwork et al., Fairness Through Awareness, In Proceedings of the 3rd Innovations in Theoretical Computer Science Conference, ACM, Available Online at: http://dx.doi.org/10.1145/2090236.2090255, Nov. 29, 2011, pp. 214-222.

Eisenstat, The Real Reason Tech Struggles with Algorithmic Bias, Wired Opinion, Available Online at: https://www.wired.com/story/the-real-reason-tech-struggles-with-algorithmic-bias/, Feb. 12, 2019, 3 pages.

Feldman et al., Certifying and Removing Disparate Impact, In Proceedings of the 21th ACM SIGKDD International Conference on Knowledge Discovery and Data Mining, Available Online at: http://dx.doi.org/10.1145/2783258.2783311, Aug. 10-13, 2015, 10 pages.

Friedler et al., A Comparative Study of Fairness-enhancing Interventions in Machine Learning, Proceedings of the Conference on Fairness, Accountability, and Transparency, Available Online at: http://dx.doi.org/10.1145/3287560.3287589, Jan. 2019, pp. 329-338.

Hall et al., The Weka Data Mining Software: An Update SIGKDD Explorations Newsletter, vol. 11, No. 1, Available Online at: http://dx.doi.org/10.1145/1656274.1656278, Jun. 2009, pp. 10-18.

Hamilton, AI Perpetuating Human Bias in the Lending Space, Tech Times, Available Online at: https://www.techtimes.com/articles/240769/20190402/, Apr. 2, 2019, 3 pages.

Hardt, How big data is unfair, Available Online at: https //medium.com/@mrtz/how-big-data-is-unfair-9aa544d739de, Sep. 26, 2014, 7 pages.

Hardt et al., Equality of Opportunity in Supervised Learning, 30th Conference on Neural Information Processing Systems, Available Online at: https://arxiv.org/abs/1610.02413, Oct. 11, 2016, pp. 3315-3323.

(56) References Cited

OTHER PUBLICATIONS

Heer, Agency Plus Automation: Designing Artificial Intelligence Into Interactive Systems Proceedings of the National Academy of Sciences of the United States of America, vol. 116, No. 6, Available Online at: http://dx.doi.org/10.1073/pnas.1807184115, Feb. 5, 2019, pp. 1844-1850.

Holstein et al., Improving Fairness in Machine Learning Systems: What do Industry Practitioners Need?, Proceedings of the CHI Conference on Human Factors in Computing Systems, Available Online at: http://dx.doi.org/10.1145/3290605.3300830, May 2019, 16 pages.

Jameson, Adaptive Interfaces and Agents, The human-computer interaction handbook: fundamentals, evolving technologies and emerging applications, Jan. 2002, pp. 305-330.

Kamiran et al., Classifying without Discriminating, IEEE 2nd International Conference on Computer, Control and Communication, Available Online at: http://dx.doi.org/10.1109/IC4.2009.4909197, 2009, 6 pages.

Kamiran et al., Classification with No Discrimination by Preferential Sampling Databases and Hypermedia, Available Online at: https://dtai.cs.kuleuven.be/events/Benelearn2010/submissions/benelearn2010_submission_18.pdf, 2010, 6 pages.

Kearns et al., Preventing Fairness Gerrymandering: Auditing and Learning for Subgroup Fairness, Proceedings of the 35th International Conference on Machine Learning, vol. 80, Available Online at: http://proceedings.mlr.press/v80/kearns18a12, 2018, 9 pages.

Kilbertus et al., Avoiding Discrimination through Causal Reasoning, 31st Conference on Neural Information Processing Systems, Available Online at: https://arxiv.org/abs/1706.02744, 2017, pp. 656-666.

Kleinberg et al., Human Decisions and Machine Predictions, The Quarterly Journal of Economics, vol. 133, No. 1, Available Online at: http://dx.doi.org/10.3386/w23180, Feb. 2017, pp. 237-293.

Koh et al., Understanding Black-Box Predictions via Influence Functions, In ICML, Available online at: https://arxiv.org/pdf/1703.04730.pdf, Jul. 10, 2017, 11 pages.

Kohavi et al., Adult Data Set, UCI Machine Learning Repository Center for Machine Learning and Intelligent Systems, Available Online at: https://archive.ics.uci.edu/ml/datasets/adult, 1996, 3 pages.

Kong et al., Internal and External Visual Cue Preferences for Visualizations in Presentations, Eurographics Conference on Visualization, vol. 36, No. 3, Available Online at: http://dx.doi.org/10.1111/cgf.13207, 2017, 11 pages.

Kong et al., Understanding Visual Cues in Visualizations Accompanied by Audio Narrations, Proceedings of the CHI Conference on Human Factors in Computing Systems, Available Online at: http://dx.doi.org/10.1145/3290605.3300280, May 4-9, 2019, pp. 1-13.

Krause et al., Interacting with Predictions: Visual Inspection of Black-box Machine Learning Models, Proceedings of the CHI Conference on Human Factors in Computing Systems, Available Online at: http://dx.doi.org/10.1145/2858036.2858529, May 7-12, 2016, pp. 5686-5697.

Kroll et al., Accountable Algorithms, University of Pennsylvania Law Review, vol. 165, Available Online at: https://scholarship.law.upenn.edu/penn_law_review/vol165/iss3/3, 2017, pp. 633-705.

Kulesza et al., Principles of Explanatory Debugging to Personalize Interactive Machine Learning, Proceedings of the 20th International Conference on Intelligent User Interfaces, Available Online at: http://dx.doi.org/10.1145/2678025.2701399, Mar. 2015, pp. 126-137.

Kusner et al., Counterfactual Fairness, 31st Conference on Neural Information Processing Systems, Available Online at: https://arxiv.org/abs/1703.06856, 2017, pp. 4066-4076.

Lee et al., Algorithmic Mediation in Group Decisions: Fairness Perceptions of Algorithmically Mediated vs. Discussion-Based Social Division, Proceedings of the ACM Conference on Computer Supported Cooperative Work and Social Computing, Available Online at: http://dx.doi.org/10.1145/2998181.2998230, Feb. 25-Mar. 1, 2017, pp. 1035-1048.

Mittelstadt et al., The Ethics of Algorithms: Mapping the Debate Big Data & Society, vol. 3, No. 2, Available Online at: http://dx.doi.org/10.1177/2053951716679679, Jul.-Dec. 2016, pp. 1-21.

Munoz et al., Big Data: A Report on Algorithmic Systems, Opportunity, and Civil Rights, Executive Office of the President, Available Online at: https://www.hsdl.org/abstract%5C&did=792977, May 2016, 29 pages.

O'Neil et al., Weapons of Math Destruction: How Big Data Increases Inequality and Threatens Democracy, Broadway Books, 2016, 208 pages.

Ratanjee, How HR Can Optimize People Analytics, Available Online at: https://www.gallup.com/workplace/259958/optimize-people-analytics.aspx, Jul. 5, 2019, 8 pages.

Ren et al., Squares: Supporting Interactive Performance Analysis for Multiclass Classifiers, IEEE Transactions on Visualization and Computer Graphics, vol. 23, No. 1, Available Online at: http://dx.doi.org/10.1109/TVCG.2016.2598828, 2016, 10 pages.

Resnick et al., Recommender Systems, Communications of the ACM, vol. 40, No. 3, Available Online at: http://dx.doi.org/10.1145/245108.245121, Mar. 1997, 3 pages.

Ribeiro et al., Why Should I Trust You? Explaining the Predictions of any Classifier, Proceedings of the 22nd ACM SIGKDD International Conference on Knowledge Discovery and Data Mining, Available Online at: http://dx.doi.org/10.1145/2939672.2939778, Aug. 2016, pp. 1135-1144.

Romei et al., A Multidisciplinary Survey on Discrimination Analysis The Knowledge Engineering Review, vol. 29, No. 5, Available Online at: http://dx.doi.org/10.1017/S0269888913000039, 2014, pp. 1-54.

Saleiro et al., Aequitas: A Bias and Fairness Audit Toolkit, Available Online at: https://arxiv.org/abs/1811.05577, 2018, pp. 1-19.

Saxena et al., How do Fairness Definitions Fare? Examining Public Attitudes Towards Algorithmic Definitions of Fairness, Proceedings of the AAAI/ACM Conference on AI, Ethics, and Society, Available Online at: http://dx.doi.org/10.1145/3306618.3314248, Jan. 2019, pp. 99-106.

Unpublished U.S. Appl. No. 16/411,515, filed May 13, 2019. In accordance with the Waiver of the Copy Requirements in 37 CFR 1.98 for Cited Pending U.S. Patent Applications, 1287 O.G. 163 (Oct. 19, 2004).

Sottek, Amazon Working to Address Racial Disparity in Same-day Delivery Service, Bloomberg, Available Online at: https://www.theverge.com/2016/5/8/11634830/amazon-same-day-delivery-racial-bias-pledge, May 8, 2016, 2 pages.

Springer et al., Assessing and Addressing Algorithmic Bias—But Before We Get There, Association for the Advancement of Artificial Intelligence Spring Symposium Series, 2018, pp. 450-454.

Swarns, Biased Lending Evolves, and Blacks Face Trouble Getting Mortgages, The New York Times, Available Online at: https://www.nytimes.com/2015/10/31/nyregion/hudson-city-bank-settlement.html, Oct. 30, 2015, 5 pages.

Tramer et al., FairTest: Discoveiing Unwarranted Associations in Data-Driven Applications, IEEE European Symposium on Security and Privacy, Available Online at: http://dx.doi.org/10.1109/EuroSP.2017.29, 2017, pp. 401-416.

Veale et al., Fairness and Accountability Design Needs for Algorithmic Support in High-Stakes Public Sector Decision-Making, Proceedings of the CHI Conference on Human Factors in Computing Systems, Available Online at: http://dx.doi.org/10.1145/3173574.3174014, Apr. 21-26, 2018, pp. 1-14.

Wachter-Boettcher, Sara, Why You Can't Trust AI to Make Unbiased Hiring Decisions, Available Online at: https://time.com/4993431/, Oct. 25, 2017, accessed Jun. 14, 2020, 4 pages.

Wallace et al., Making Design Probes Work, Proceedings of the SIGCHI Conference on Human Factors in Computing Systems, Available Online at: http://dx.doi.org/10.1145/2470654.2466473, Apr. 2013, pp. 3441-3450.

Wexler et al., The What-If Tool: Interactive Probing of Machine Learning Models, IEEE Transactions on Visualization and Computer Graphics, vol. 26, No. 1, Available Online at: http://dx.doi.org/10.1109/TVCG.2019.2934619, arXiv:1907.04135v2, Oct. 3, 2019 10 pages.

(56) References Cited

OTHER PUBLICATIONS

Zafar et al., Fairness Beyond Disparate Treatment & Disparate Impact: Learning Classification without Disparate Mistreatment, In Proceedings of the 26th International Conference on World Wide Web, International World Wide Web Conferences Steering Committee, Available Online at: http://dx.doi.org/10.1145/3038912.3052660, Apr. 3-7, 2017, pp. 1171-1180.

Zafar et al., Fairness Constraints: Mechanisms for Fair Classification, Proceedings of the 20th International Conference on Artificial Intelligence and Statistics, Available Online at: https://arxiv.org/abs/1507.05259, 2015, 12 pages.

Zemel et al., Learning Fair Representations, In International Conference on Machine Learning, vol. 28, Available Online at: http://proceedings.mlr.press/v28/zemel13, 2013, pp. 325-333.

Zhang et al., Manifold: A Model-Agnostic Framework for Interpretation and Diagnosis of Machine Learning Models, IEEE Transactions on Visualization and Computer Graphics, vol. 25, No. 1, Available Online at: http://dx.doi.org/10.1109/TVCG.2018.2864499, 2018, pp. 364-373.

Matlab, MATLAB & Simulink, Available online at: https://www.mathworks.com/products/matlab.html, 2019, 4 pages.

The U.S. Equal Employment Opportunity Commission, https://www.eeoc.gov/policy/docs/qanda_clarify_procedures.html. Mar. 1979.

Biplav Srivastava and Francesca Rossi. Towards composable bias rating of ai services. In AAAI/ACM Conference on Artificial Intelligence, Ethics, and Society, 2018.

Niche Envy. Marketing discrimination in the digital age. https://mitpress.mit.edu/ books/niche-envy, 2006.

Toon Calders and Sicco Verwer. Three naive bayes approaches for discrimination-free classification. Data Mining and Knowledge Discovery, 21(2):277-292, 2010.

Michael Feldman, Sorelle A Friedler, John Moeller, Carlos Scheidegger, and Suresh Venkata-subramanian. Certifying and removing disparate impact. In Proceedings of the 21th ACM SIGKDD International Conference on Knowledge Discovery and Data Mining, pp. 259-268. ACM, 2015.

Flavio P Calmon, Dennis Wei, Karthikeyan Natesan Ramamurthy, and Kush R Varshney. Optimized data pre-processing for discrimination prevention. arXiv preprint arXiv:1704.03354, 2017.

Rich Zemel, Yu Wu, Kevin Swersky, Toni Pitassi, and Cynthia Dwork. Learning fair representations. In International Conference on Machine Learning, pp. 325-333, 2013.

Moritz Hardt, Eric Price, Nati Srebro, et al. Equality of opportunity in supervised learning. In Advances in neural information processing systems, pp. 3315-3323, 2016.

Depeng Xu, Shuhan Yuan, Lu Zhang, and Xintao Wu. Fairgan: Fairness-aware generative adversarial networks. arXiv preprint arXiv:1805.11202, 2018.

Brian Hu Zhang, Blake Lemoine, and Margaret Mitchell. Mitigating unwanted biases with adversarial learning. arXiv preprint arXiv:1801.07593, 2018.

Alex Beutel, Jilin Chen, Zhe Zhao, and Ed H Chi. Data decisions and theoretical implications when adversarially learning fair representations. arXiv preprint arXiv:1707.00075, 2017.

Ian Goodfellow, Yoshua Bengio, Aaron Courville, and Yoshua Bengio. Deep learning, vol. 1. MIT press Cambridge, 2016.

Amazon working to address racial disparity in same-day delivery service. https://www.theverge.com/2016/5/8/11634830/ amazon-same-day-delivery-racial-bias-pledge. Mar. 1979.

U.S. Appl. No. 16/411,515, May 3, 2021, Office Action.
U.S. Appl. No. 16/411,515, dated Jul. 8, 2022, Office Action.
U.S. Appl. No. 16/411,515, dated Oct. 3, 2022, Notice of Allowance.

* cited by examiner

METHODS AND SYSTEMS FOR DETECTION AND ISOLATION OF BIAS IN PREDICTIVE MODELS

TECHNICAL FIELD

This disclosure generally relates to machine-learning models. More specifically, but not by way of limitation, this disclosure relates to the detection and isolation of bias in predictive machine-learning models.

BACKGROUND

Automated modeling systems are used for analyzing interactions with online services that provide digital forums in which end users may interact with online content (e.g., by purchasing products or services, commenting on products or services, etc.). Automated modeling systems use modeling algorithms that involve techniques such as logistic regression, neural networks, support vector machines, etc. These automated modeling algorithms are trained using training data, which can be generated by or otherwise indicate certain electronic interactions, transactions, or circumstances. This training data is analyzed by one or more computing devices of an automated modeling system. The training data is grouped into predictor variables that are provided as inputs to the automated modeling system. The automated modeling system uses this analysis to make predictions using data describing similar circumstances. For example, the automated modeling system uses the predictor variables to learn how to generate predictive outputs involving online interactions (or other circumstances) that are similar to the predictor variables from the training data.

Once the automated modeling system is trained, the modeling system may be tested to ensure the accuracy of future predictions. Evaluation of automated modeling systems focuses on performance (e.g., prediction accuracy). For instance, a given test input is associated with a label indicating an expected prediction for the test input. A comparison between a prediction and the label for the test input indicates an accuracy of the model to predict the test input. A performance metric indicates an overall accuracy of the automated modeling system to generate predictions. If the performance metric falls below a threshold (i.e., the model is inaccurately generating predictions), then the automated modeling system is retrained.

Existing techniques for testing models may present disadvantages. For example, evaluating model performance as a testing process only identifies the overall accuracy of the model. Frequently, an overall accuracy metric masks the presence biases in the predictive model with respect to particular predictor variables. Biases in the automated modeling system represent a failure in the model to generate accurate predictions associated with particular predictor variables. Testing overall accuracy fails to identify the presence of biases that degrade model performance. In addition, testing overall model accuracy does not provide an indication as to the cause of model performance degradation due to biases, thereby preventing effective methods for correcting the predictive model. For instance, if the cause if the error is in the training data, retraining the model will reproduce the error. Thus, existing techniques for testing predicative models fail to identify errors in models and do provide enough information for corrective action.

SUMMARY

Aspects of the present disclosure involve detecting and isolating biases in predictive models. For example a processing device receives training that trained the trained the predictive model and test data from a client device. The processing device identifies one or more feature groups from the training data and test data. The processing device then generates performance metrics and baseline metrics for each feature group. The process device detects a bias through a comparison between the performance metrics and the baseline metrics for a feature group. The processing device isolate a portion of the training data that corresponds to the detected bias and generates a model correction, based on the isolated training data, that is usable to reduce or eliminate the detected bias.

These illustrative examples are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
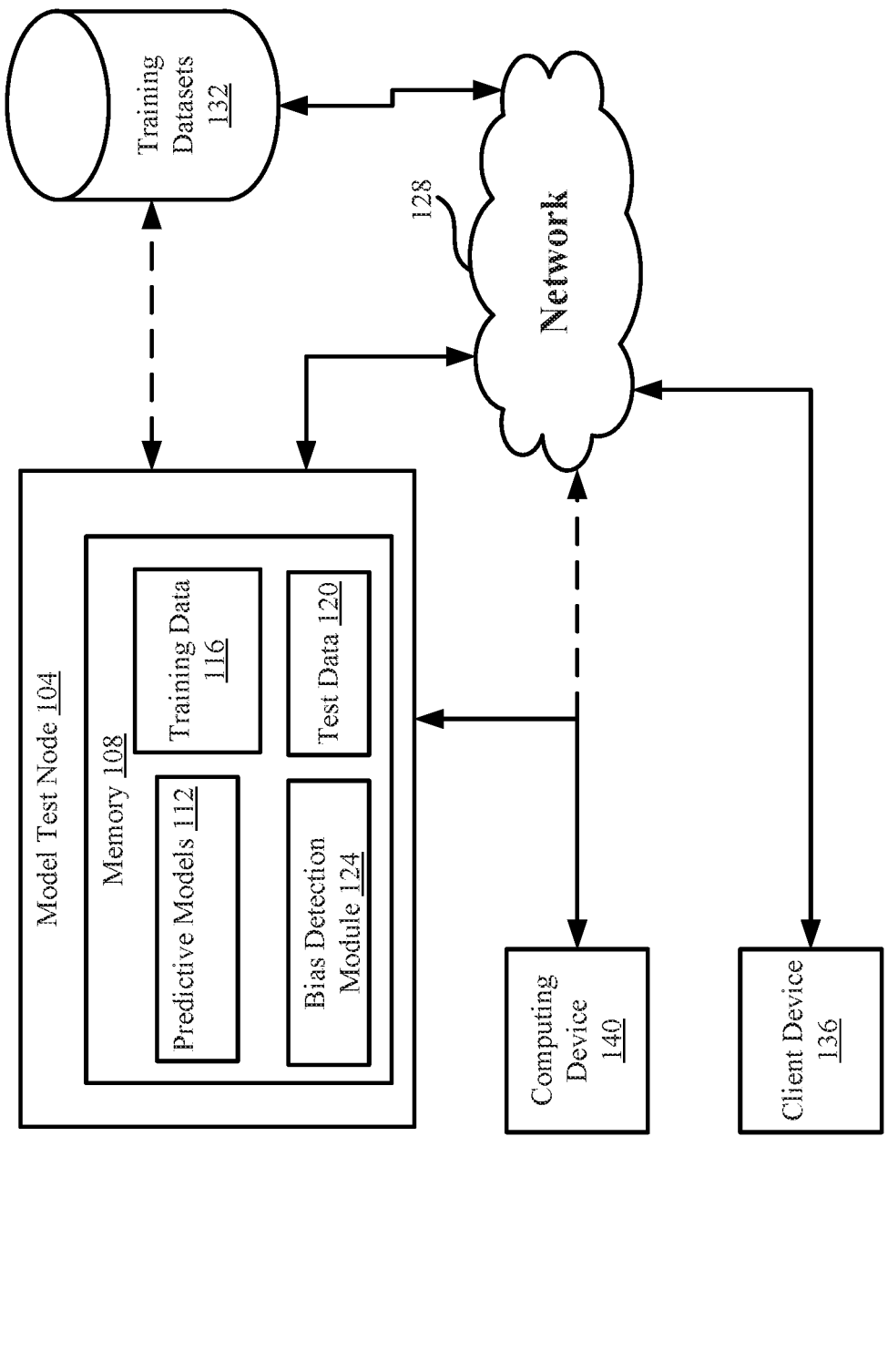
FIG. 1 depicts an example of a network environment to test for bias in predictive models, according to certain embodiments of the present disclosure.

The present disclosure involves the detection and isolation of bias in predictive models. Certain embodiments described herein improve the performance (e.g., accuracy) of predictive models, such as machine-learning models and the like by testing for operational biases with respect to particular input features. A computing device uses a training dataset that was used to train a predictive model and a test dataset corresponding to an output of the predictive model to enumerate feature groups. The computing device detects biases in the predictive model by comparing, for each feature group, the performance of the predictive model to the performance of a baseline for that feature group. The computing device identifies a type of bias associated with the detected bias. The computing device uses the detected bias along with the identified type of bias to generate a model correction that removes the bias from the predictive model, thereby improving the overall performance of the predictive model.

The following non-limiting example is provided to introduce certain embodiments. In this example, a computing device receives user input from a client device associated with a predictive model used to predict an employee performance category (e.g., below expectations, meets expectation, or above expectation). The user input includes a training dataset that was used during a training phase of the predictive model and a test dataset including an output of the predictive model generated through operation of the model. In this example, the training dataset includes human resource records associated with employees such as demographic data, historical job performance, current job evaluations, and the like, and the test dataset corresponds to a prediction generated by the predictive model such as predicted job performance.

The computing device uses the training dataset or the test dataset to enumerate feature groups that correspond to one or more features processed by the predictive model to derive a predictive output. In this example, the feature group includes two or more attributes of an employee record such as a particular gender and a particular race. The computing device processes the training dataset and test dataset to automatically identify the feature groups. Alternatively, the computing device receives user input that specifies the attributes making up one, more than one, or all of the feature groups.

The computing device uses the test dataset to generate a performance metric that corresponds to the performance of the predictive model with respect to each of the feature groups. The performance metric includes an overall performance metric and, for each feature group, an accuracy of the predictive model in generating predictions associated with that feature group. For instance, for each feature group, the performance metric includes the classification accuracy, classification rate, true positive rate, and false positive rate associated with the feature group. The computing device uses test dataset to generate a baseline dataset that corresponds to the performance of the predictive model with respect to the complement of each of the feature groups. The complement of a feature group is a feature group with complementary attributes. For instance, the complement of a feature group that corresponds to Asian males is a feature group that corresponds to non-Asian males.

The computing device compares the performance metric to the baseline dataset to identify biases between the feature groups. For instance, the comparison indicates the presence of a bias for or against a particular feature group relative to the other feature groups. Returning the employee performance prediction example, the comparison indicates that a particular feature group is predicted as being at a particular performance category significantly more or less than its compliment feature group or other feature groups. For example, the computing device identifies that Asian males are predicted to be in the above expectation category more so than non-Asian males.

The computing device identifies a cause for detected biases using the performance metric and the training dataset. For instance, predictive models are not inherently biased towards any particular prediction. The training dataset, which trains the predictive model, introduces biases into the predictive model. If a particular feature group is over-represented or under-represented in the training dataset, the trained predictive model will over-predict or under-predict (respectively) that feature group as being associated with a particular category. The computing device analyzes the training dataset based on the types of biases to isolate portions of the training data that correspond to biased feature groups. Further analysis of the isolated portions of the training dataset by the computing device determines the root cause of the detected bias.

The computing device generates a model correction based on an identified cause of the bias. The model correction reduces or removes the bias and increases the accuracy of the predictive model. The computing device transmits the model correction to the client device to modify the predictive model removing the bias. In one example, the model correction includes a graphical user interface that represents the performance metric and the baseline dataset with respect to each feature group. The graphical user interface also includes an identification of the portion of the training dataset that corresponds to the biased feature group and a root cause of the bias. The client device uses the information identified by the graphical user interface to modify the training dataset and retrain the predictive model to remove the bias.

In another example, the model correction includes a modified training data to be added to or to replace the training dataset. The modified training data is procedurally generated to increase or decrease the representation of one or more feature groups. The client device retrains the model using the modified training data to remove the detected bias. In still yet another example, the model correction includes instructions executable by the client device to modify the trained predictive model directly. The computing device identifies the type of model (e.g., machine-learning model, neural network, decision tree, etc.). Once identified, the computing device generates a modification to the model. For instance, for a neural network, the modification includes modification to the weights associated with one or more layers (up and including the hidden layer) to emphasize the processing with respect to particular neural pathways over other pathways.

As used herein, the term "bias" in predictive models refers to a fault in predictive models causes the predictive model to generate incorrect predictions in which members of a class are assigned a particular (and potentially incorrect) prediction due to their association with the class. Biases represent an error in the processing logic of predictive models that causes the predictive model to generation incorrect predictions. Since the incorrect predictions are only associated with members of a class, biases can be difficult detect. For example, a bias associated with a feature group may cause members of the feature group to receive a similar prediction due to their membership with the feature group rather than based on the individual attributes of each member. In general, untrained predictive models are not biased towards any particular prediction. Predictive models become biased during training due to data sampling in training datasets.

As used herein, the term "accuracy" refers to a measure of the correct predictions by the predictive model. Accuracy may be expressed as empirical measure such a function of both the quantity of correct prediction and the total quantity of predictions. For instance, accuracy may be expressed the quantity of correct predictions divided by the quantity of generated predictions. In other instances, accuracy is expressed as a grade (e.g., from A-F, from 1-10, or the like) or in any other manner in which the likelihood that a given prediction by the prediction is correct can be conveyed.

As used herein, the term "training dataset" refers to data used to train a predictive model to generate predictions. The contents of the training dataset may be based on the type of learning such as supervised learning, unsupervised learning, or partially supervised learning and partially unsupervised learning. In supervised learning, the training dataset includes input data that includes sets of attributes with each set of attributes including a label. The each set of attributes is passed as input into the predictive model and the predictive generates a prediction based on the set of attributes. The predictive model compares the prediction to the label to determine if the prediction is correct. The predictive model uses whether the prediction was correct to modify internal processes to improve future predictions.

In unsupervised learning, the training dataset does not include labels. The input data is passed to the predictive model. The predictive model processes each set of attributes to identify relationships in the training data. The predictive model modifies the internal processes based on identified relationships to generate a prediction for a future set of attributes. In general, a training dataset includes data in a same format that the predictive model will receive during routine operations after being trained. The training dataset can include live data such as historical and contemporaneously collected by client devices during routine operations or synthetic data such as data generated to training the predictive model. Training datasets may be manually generated or automatically generated (e.g., such as procedurally).

As used herein, the term "test data" refers to data used in the testing the accuracy of trained predictive models. Test data may include input data such as a set of attributes with each set of attributes associated with a label and the corresponding predictions generated from the input data. The test data determines an overall accuracy of the predictive model in generating predictions over the input data. In general, the input data includes sets of attributes (and labels) for each predictions type generated by the predictive model such that every possible prediction type generated by the predictive model can be generated and thereby tested. In some instances, the input data includes sets of attributes and labels associated with each feature group where feature groups are a subject of predictions generated by the predictive model. For instance, for a predictive model generating predictions of employee performance, the input data includes sets of attributes and labels to determine the accuracy of the predictive model in generating predictions for each employees associated with a particular group or demographic.

As used herein, the term "feature groups" refers to a representation of a group of objects that are the subject of predictions by the predictive model. Each object includes a set of attributes that passed as input into predictive model to generate a prediction associated with the object. A feature group is defined by one or more characteristics that are shared by each object of the feature group. A feature group includes any number of members including a single member, all members over which predictions are generated, or anywhere in-between. For example, for a predictive model generating predictions of employee performance, the employees are representative of objects and a feature group corresponds to a group of employees that each share a common set of characteristics such as demographic information (e.g., Asian males), positional information (e.g., executive officers), geographical information (e.g., in the New York office, in the Northeast, etc.), salary information, historical predictions, combinations thereof, or the like.

Example of an Operating Environment for Testing Predictive Models

Referring now to the drawings, FIG. 1 depicts an example of a network environment to test for bias in predictive models, according to certain embodiments of the present disclosure. The model test node 104 is any computing device configured to test predictive models. In some instances, the model test node 104 includes a single computing device configured to test an instance of a predictive model. In other instances, model test node 104 is a single processing node of a distributed processing network such as a cloud system. In those instances model test node execute with one or more other model test nodes to test a predictive model. The number of model test nodes 104 executing to test a predictive model scales with difficulty of the testing or predetermined time interval over which testing is to occur. For instance, if the cloud system tests a predictive model over a short duration of time additional model test nodes 104 are instantiated to process a portion of the testing. A load balancer, such as a computing device 140, operates through network 128 to distribute discrete portions of the testing. For instance, a first model test node 104 tests the accuracy of the predictive model and another model test node 104 tests the accuracy of the model with respect to particular types of inputs or predictions. When operating as a node in a distributed cloud system the operations of model test node 104 can executed one a single physical computing device as depicted in FIG. 1 or on any of one or more physical computing devices.

The model test node 104 includes memory 108 for storing data associated with predictive models and executable instructions for performing testing. Memory 108 stores test data 120 and training data 116 associated with an instance of a predictive model under test and received from a client device 136. Training data 116 includes some or all of the data used to train a particular instance of a predictive to be tested by the model test node 104. Test data 120 includes some or all of the data used to test the accuracy of the predictive model. In some instances, test data includes non-test data such as data corresponding to the routine operation of the predictive model including, but not limited to, input data, output data, diagnostic data, combinations thereof, and the like. Examples of test data include, but are not limited to, unit tests and corresponding results, input to the predictive model with corresponding output (e.g., predictions made by the predictive model based on the input) and ground truth data (e.g., known classifications of the input), operational data (e.g., input and output of the predictive model during routine operation of the predictive mode), combinations thereof, and the like.

The model test node 104 includes the predictive model data 112. In some instances, the predictive models data 112 receives an instance of the predictive model under test from client device 136 through network 128. For instance, the client device 136 transmits a request to test a predictive model. The client device 136 transmits the training data 116, the test data 120, and the instance of the predictive model to the model test node 104. In other instances, predictive model data 112 does not include an instance of the predictive model itself, but may include metadata corresponding to the instance of the predictive model. Examples of the data that may be included in the metata include, but are not limited to, an identification of a type of predictive model (e.g., particular machine-learning model, statistical model, etc.), information associated how the predictive model was trained, expected output types (e.g., classifications), measured model performance, expected model performance, combinations thereof, and the like. The metadata is stored with the test data 120 in the memory 108. In still yet other instances, the metadata may be generated by the model test node 104 during the operation of the bias detection module 124. In those instances, the model test node 104 receives only the training data 116 and the test data 120. The model test node detects biases (e.g., using the bias detection module), isolates training data associated with detected biases, and/or generates a model correction without the instance of the predictive model under test.

The bias detection module 124 includes a set of software instructions executable by the model test node 104 to test a predictive model. The bias detection module 124 tests the predictive model using the predictive model data 112 (if present), the training data 116, and the test data 120. The set of instructions include instructions for identifying an overall model predictive model performance and the performance of the predictive model per each feature or feature group (e.g., two or more features). Features are characteristics of a class and used by the predictive model to form a prediction. For example, for a predictive model that predicts employee performance evaluations, features correspond to any characteristic of an employee, such as, but not limited to gender, time interval of employment, job position, ethnicity, historical job performance, supervisor, team, department, job duties, office location, and the like. Features are used, in part, by the model to formulate a predictions associated with the feature. For instance, using the previous example, the predictive model receives input data corresponding to an employee characterized by a set of features (e.g., an employee having a particular supervisor, job position, gender, etc.). The predictive model generates a prediction of the performance evaluation of that employee.

The bias detection module 124 determines an overall performance of the predictive model and the performance of the predictive model relative to individual features or feature groups. In other words, the bias detection module 124 determines if the predictive model is biased towards predictions associated with particular features. For instance, using the example above, the bias detection module 124 generates a feature group for Asian males and determines whether the predictive model generates predictions for employees that match that feature group accurately relative to other feature groups. The bias detection module 124 determines if a feature group is significantly more or less accurate than other feature groups. The bias detection module 124 determines four types of bias: classification accuracy (e.g., the percentage of Asian males with correct classifications divided by the total number of Asian male employees), classification rate (e.g., the number of Asian males classified according to a performance evaluation category divided by the total number of Asian male employees), true positive rate (e.g., the number of Asian males classified according to a particular performance evaluation category divided by the total number of Asian male who were actually evaluated as being that particular performance evaluation category), and false positive rate (e.g., the number of Asian males classified according to a particular performance evaluation category divided by the total number of Asian male who were actually evaluated as being a different performance evaluation category).

The bias detection module 124 enumerates the features over which the predictive model is tested. In some instances, the bias detection module 124 enumerates the features to test the predictive model from an analysis of the training data 116 and/or the test data 120. For instance, the bias detection module 124 enumerates a set of features by identifying types of predictions that are generated, characteristics of a class (e.g., employees) that are the subject of the generated predictions, and/or statistically relevant aspects of the training data 208 or input data 212 such as data types, data structures, reoccurring data values, and the like. For example, the bias detection module 124 analyzes the test data 120 to determine types of predictions generated from the predictive model. Using the employee evaluation example, the bias detection module 124 identifies predictions that a particular employee is below expectations, meets expectations, or exceeds expectations.

The bias detection module 124 defines feature groups from the set of features. Feature groups represent a subclasses over which bias detection module 124 tests the predictive model. For instance, an employee may be associated with a number of different features such as a gender, an ethnicity, position, a supervisor, a geolocation, an office location, salary, historical evaluations, etc. A feature group is made of one or more features in which each member of the feature group includes the one or more features. For example, Asian males is a feature group with two features, Asian and males, that represents a subclass of employees.

In other instances, the model test node 104 receives user input that identifies the one or more feature groups. In still yet other instances, the bias detection module 124 identifies some features to test the predictive model while other features are identified from user input.

The bias detection module 124 identifies a cause of the bias. Generally, untrained predictive models are not inherently biased towards any particular prediction. Biases are introduced when the predictive model is trained due errors in the training data. Training data may induce biases in a predictive model by include too much data associated with a particular feature or feature group, too little data associated with a particular feature or feature group, incorrect labels, insufficient training data, combinations thereof, or the like. The bias detection module 124 identifies one or more types of bias associated with a particular feature or feature group then identifies the portion of the training data 116 that corresponds to the feature or feature group. The bias detection module 124 determines a model correction that when introduced into the predictive model will reduce or eliminate the identified bias. The model correction includes modified training data 116, new training data, or a modification to the predictive model.

The training datasets 132 include training data used to train one or more types of predictive models. The model test node 104 uses the training datasets to generate the model correction. The model test node 104 receives some or all of the training data associated with a model type that matches the type of predictive model being tested. In some instances, model test node 104 receives a seed from the training datasets 132. A seed is a data structure that enables the procedural generation of data. The model test node 104 uses the seed to procedurally generate any amount of training data that corresponds to the predictive model. The seed may be combined with a particular feature or feature group to generate training data that corresponds to that feature or feature group.

For instance, returning to the employee performance evaluation example, if the model test node 104 identifies that the predictive model over-predicts female executives as having below-average performance, the model test node 104 determines the portion of the training data 116 that corresponds to the feature group female executives. The model test node 104 analysis the training data 116 to determine a type model correction to reduce the bias such as increasing training data corresponding to female executives with labels that correspond to meets expectations and exceeds expectations, decreasing training data associated with female executives that have a label of below expectations, increasing or decreasing training data corresponding to another feature or feature groups, or the like. The model test node 104 then uses the seed to procedurally generate training data that corresponds the type of model correction.

If the model test node 104 includes an instance of the predictive model then the model test node 104 applies the model correction (e.g., retraining the predictive model using the modified training data 116). If the model test node 104 does not include an instance of the predictive model, then the model correction along with the results of the testing are output.

The operations of the model test node 104 may be controlled by the computing device 140. For instance, the computing device 140 distributes requests to test a predictive model to one or more model test nodes 104. In that instance, the computing device 140 operates as a load balancer to ensure that the testing operations are distributed across the model test nodes 104 so as to reduce resource consumption in the individual model test nodes 104 or reduce the execution time of the testing operation. In some instances, the model test node 104 transmits test results to the computing device 140. If the testing is performed in a distributed operations with other model test nodes, the computing device 140 aggregates the individual test results (and/or the model correction) from each model test node to generate a complete test result. The computing device 140 may generate a graphical user interface that presents a graphical representation of the complete test result or transmit the complete test result to the client device 136. In other instances, the model test node 104 transmits the test results directly to client device 136 and optionally, also to computing device 140.

Figure 2:
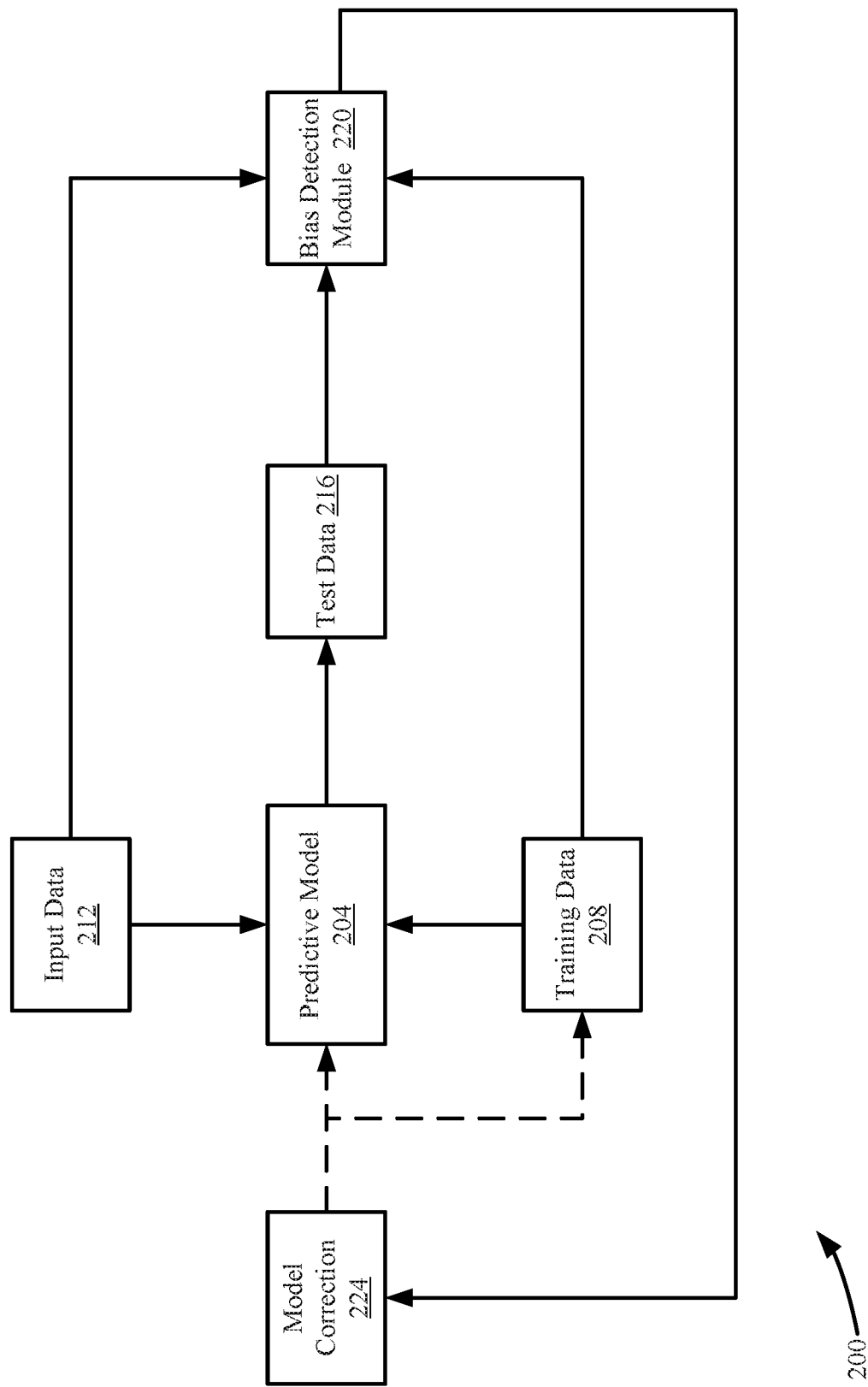
FIG. 2 depicts an example of a block diagram for testing and correcting predictive models, according to certain embodiments of the present disclosure.

FIG. 2 depicts a block diagram of an example system 200 for testing and correcting predictive models, according to certain embodiments of the present disclosure. The system 200 includes a predictive model 204 that is under test. The predictive model 204 can be any machine-learning model configured to processes an input to generate an output such as a prediction based on the input. Examples of predictive models include decision trees, artificial neural networks, logistic regression, k-nearest neighbor, support vector machines, and the like.

The system 200 includes a trained instance of the predictive model 204 for testing. For instance, the system 200 receives the instance of the predictive model 204 from a client device requesting a testing operation. The system 200 may also receive training data 208, input data 212 before commencing testing of the predictive model. The training data 208 corresponds to the data used to train the predictive model 204. The input data 212 includes data passed as input into the predictive model 212 that causes the predictive model 204 to generate a corresponding output. The system 200 generates test data 216 by executing the predicative model on the input data 212 and storing the resulting output. In some instance (not shown), the system 200 may receive test data 200 generated by the client during operation of the predictive model by the client device. Alternatively, the system 200 generates the input data 212 using a procedural data generator or from user input.

In some instances, the system 200 receives an identification of a predictive model 204 from the client device rather than the predictive model itself. The identification of the predictive model 204 includes a model type and metadata associated with the configuration of the predictive model such as, but not limited to, amount of data used to train the predictive model, amount of time spent during training, type of training, measured model performance, classification rates each classification, and the like. The system 200 also receives the training data 208, the input data 212, and test data 216 from the client device.

The predictive model 204 under test is a trained model configured to generate a prediction based on input data 212. The predictive model 204 was trained using training data 208 with supervised learning, unsupervised learning, or a combination of supervised and unsupervised learning. The data included in training data 208 is based on the type of training performed. For instance, if the predictive model 204 was trained using supervised learning, the training data 208 includes a set of inputs with each input including a corresponding label that indicates that true classification for the input. The predictive model generates a predicted classification for each input and compares the predicted classification with the label. Based on the comparison, the predictive model incrementally modifies internal data structures to improve the next prediction.

If the predictive model 204 was trained using unsupervised learning the training data 208 does not include labels. Instead, the internal structure of the predictive model 204 are incrementally modified based on one or more processes that identify relationships in the training data 204 (e.g., correlated parameters, dependent parameters, mutually exclusive parameters, etc.). Examples of unsupervised learning processes include, but are not limited to, clustering, anomaly detection, self-organizing maps, generative adversarial networks, and the like.

Once the predictive model is trained using the training data 208, the system 200 executes the trained predictive model using the input data 212 to generate test data 216. Test data 216 is then passed to bias detection model 220. Alternatively, the system 200 receives the training data 208, the input data 212, and the test data 216 all of which are passed to bias detection module 220.

The bias detection module 220 enumerates a set of features from the predictive model, training data 208, the input data 212, or test data 216. The bias detection module 220 identifies features by identifying types of predictions that are output such as employee performance classifications in the example above, characteristics of a class (e.g., employees) about which the predictions are generated, and/or statistically relevant aspects of the training data 208 or input data 212 such as data types, data structures, reoccurring data values, and the like. For example, the bias detection module 220 analyzes the test data 216 that is output from the predictive model to determine types of predictions generated from the predictive model. Using the employee evaluation example, the bias detection module 220 identifies predictions that a particular employee is below expectations, meets expectations, or exceeds expectations.

The bias detection module 220 then generates a set of features that correspond to characteristics of the class about which predictions are made. In the employee evaluation example, employees are the class about which predictions are made and the features correspond to the characteristics of the employees. The characteristics are identified from the training data 208 and the input data 212. Examples of characteristics of employees include, but are not limited to but not limited to gender, time interval of employment, job position, ethnicity, historical job performance, supervisor, team, department, job duties, office location, and the like.

The bias detection module 220 defines feature groups from the set of features. Feature groups represent a subclasses over which bias detection module 220 tests the predictive model. For instance, an employee may be associated with a number of different features such as a gender, an ethnicity, position, a supervisor, etc. A feature group is made up of one or more features and represents a subclass of the class that includes members that each include characteristics that correspond to the one or more features. For example, Asian males is a feature group with two features, Asian and males that represents a subclass of employees. In some instances, the bias detection module 220 defines a limited quantity of feature groups based on the size of the subclass that matches the features of the feature group. For instance, the bias detection module 220 defines only those feature groups that represent a subclass of a size that exceeds a first threshold but not a second threshold. This ensures that a feature group does not include so many features so as to only represent a subclass with a single member or that a feature group is so broad so as to include all members of the class. In some instances, the bias detection module 220 receives identification of an additional one or more features or feature groups from user input. In other instances, the bias detection module 220 receives identification of all of the one or more features or feature groups from user input.

The bias detection module 220 tests the predictive model 204 to determine if the predictive model 204 is biased towards one or more feature groups. The bias detection module 220 calculates, for each feature group, one or more bias metrics. A bias metric measures a likelihood that predictive model is biased with respect to a particular prediction and feature group the predictive model. The bias metric may measure the classification accuracy with respect to the feature group, classification rate of a particular prediction associated with the feature group, true positive rate of a particular prediction associated with the feature group, or false positive rate of a particular prediction associated with the feature group.

The bias detection module 220 determines the classification accuracy with respect to a feature group by, for example, dividing the number of correct predictions associated with the feature group by the size the feature group. The bias detection module 220 determines the classification rate of a particular prediction with respect to a feature group by, for example, dividing the number of times the predictive model generated the particular prediction by the size the feature group. The bias detection module 220 determines the true positive rate of a particular prediction with respect to a feature group by, for example, dividing the number times the predictive model generated the particular prediction by the number of times the particular prediction was correct (e.g., by using a label or user input). The bias detection module 220 determines the false positive rate of a particular prediction with respect to a feature group by, for example, dividing the number times the predictive model generated the particular prediction by the number of times the particular prediction was incorrect (e.g., by using a label or user input).

The bias detection module 220 may determine the classification accuracy, the classification rate, the true positive rate, and the false positive rate in still yet other ways without departing from the spirit and scope of the present disclosure. In addition, the bias detection module 220 may calculate other forms of bias, performance characteristics, and errors other than classification accuracy, classification rate, true positive rate, and false positive rate.

The bias detection module 220 compares each bias metric of a feature group to a corresponding baseline metric for the feature group. The baseline metric is equal to the bias metric of the complement of the feature group. For instance, continuing the employee evaluation example, the bias detection module 220 compares the classification accuracy bias metric for Asian males to the corresponding baseline metric, which is the classification accuracy for complement feature group of non-Asian males.

The bias detection module 220 determines a bias is present by calculating a p-value for the difference between the bias metric and the baseline metric. The p-value is a representation of whether the difference is statistical significant. The difference between the bias metric and the baseline metric is statistically significant if the p-value is below a threshold (e.g., 0.05). Statistical significance indicates the probability that the difference is not random or unrelated. The threshold may be predetermined or dynamically determined based on the training data 208, input data 212, test data 216, or the like. In some instances, threshold may be determined from user input.

The results of bias detection module 220 are passed to model corrections 224. The results of bias detection module 220 includes, but is not limited to, an identification of a bias associated with a feature group, a performance characteristic of the predictive model, an error, combinations thereof, an identification of a cause of the bias or error such as a characteristic of the predictive model 204, a portion of the training data 208, a portion of the input data 212, combinations thereof, or the like.

The bias detection module 220 determines the portion of the training data that corresponds to the bias by generating, for each feature group, a sample size of the feature group (e.g., volume training data that corresponds to the feature group) and proportion of a label (e.g., proportion of the subclass with a label that corresponds to a particular prediction). For each feature group, the model correction 224 determines a sample size value and a value for each prediction type that indicates the proportion of the subclass that includes a label of that prediction type. For instance, in the employee evaluation example, the feature group Asian males has a sample size value, and three label based values that include the proportion of Asian males with a label of below expectations, the proportion of Asian males with a label of meets expectations, and the proportion of Asian males with a label of exceeds expectations.

The bias detection module 220 determines, from the model performance, the sample size value and the proportion of each label, whether the training data 208 includes an under-representation of training data associated with the feature group, an over-representation of training data associated with the feature group, or a pre-existing prejudice. For example, low classification accuracy for a feature group may be due to a small sample size associated with the feature group (e.g., under-representation) or that other feature groups have a much disproportionately larger sample size (e.g., over-representation in other feature groups). In another example, a model can learn from prejudice that present in the training data 208 such as a high rate of a particular prediction for members of a subclass may be due to the training data 208 including more labels for the particular prediction than for other predictions.

The model correction 224 receives the identification of the cause of the bias and generates a model correction that, when applied to the predictive model, reduces or eliminates the bias. The model correction includes modified training data, instructions to modify training data, a modification to the predictive model, or instructions to modify the predictive model. For example, if the cause of the bias is under-representation of the feature group, the model correction generates a seed usable to procedurally generate training data that conforms to the feature group. The additional training data may include an equal proportion of labels for each prediction type for the feature group to prevent replacing one bias for another bias. In some instances, the model correction includes instructions for the client device to generate the additional training data from a seed. In other instances, the model correction includes the additional training data. In still yet other instances, the model correction includes instructions that automatically modify the predictive model (e.g., by modifying the training data and retraining the predictive model).

In some instances, the model correction can include modifications to the predictive model. For instance, the model correction 224 generates the model correction based the analysis of the training data and the type of predictive model. Then the model correction 224 generates a model correction that modifies a portion of the predictive model that is associated with the bias. For instance, for a bias in a neural network, the bias detection module 220 identifies the neural pathways that generated one or more of the biased predictions as well as a cause of the bias in the training data 208. The model correction 224 generates a model correction that modifies the weights assigned to one or more of the connections between nodes of the neural pathway to increase or decrease the likelihood the connection between nodes is followed in feature predictions. For example, if the bias is due to over-representation, the weights may be reduced to reduce the effect of the over-representation in the training data.

If the model correction includes a modification to the predictive model 204, the system 200 applies the model correction to the predictive model 204. If the model correction includes a modification to the training data 208, the system 200 applies the model correction to modify training data 208. Once the training data 208 is modified, the predictive model 204 is retraining using the modified training data 208. In some instances, the process terminates once the model is directly modified or retraining with modified training data. In other instances, the process repeats to determine of the model correction successfully reduced or eliminated the identified and if the model correction introduced a new bias. If a new bias is detected, the predictive model may be rolled back to a previous state (e.g., a state prior to the application of the model correction. Alternatively, a new model correction may be developed and applied to the predictive model 204 and/or the training data 208.

Figure 3:
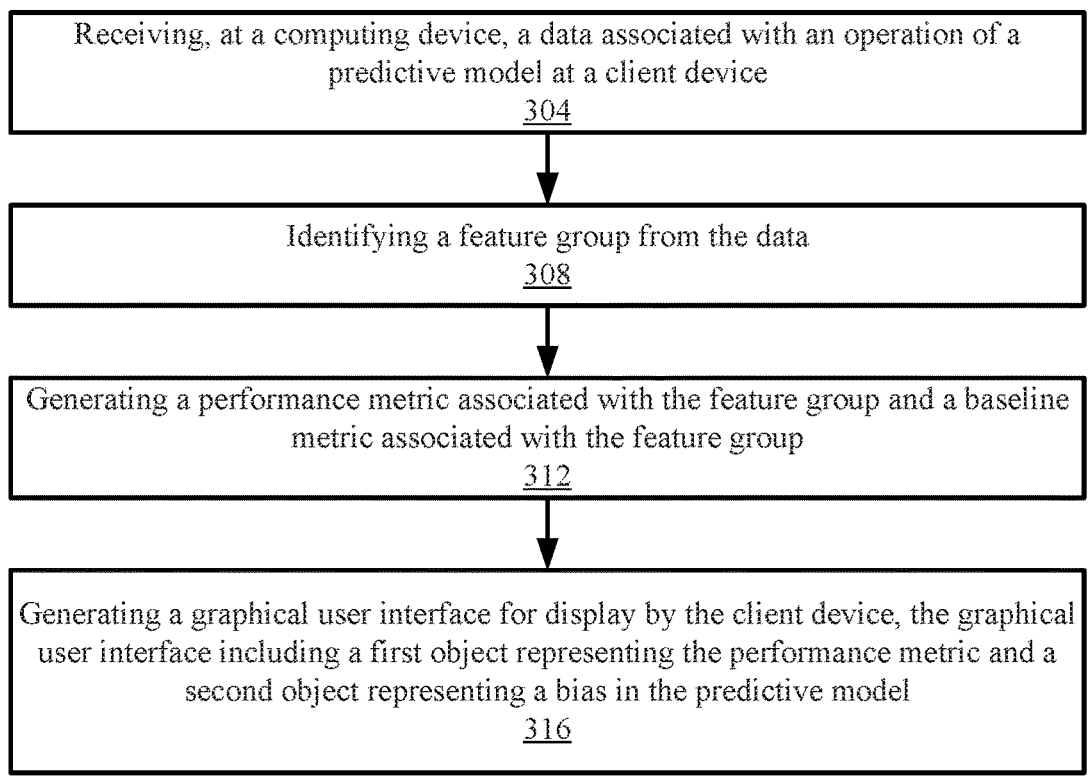
FIG. 3 depicts an example of a process for detecting bias in predictive models, according to certain embodiments of the present disclosure.

FIG. 3 depicts an example of a process for detecting bias in predictive models, according to certain embodiments of the present disclosure. A block 304, a computing device receives data associated with a trained predictive model. The data includes data output from the predictive model such as predictions associated with a class or a subclass. In some instances, the data includes the input data that was input to the predictive model to generate the output and training data used during a training phase of the predictive model.

At block 308, the computing device identifies a feature group from the data. A feature group includes one or more features. Each feature corresponds to a characteristics of a member of a class that the subject of the predictions generated by the predictive model. The computing device identifies feature groups by first identifying a set of features from the data, then selecting one or more of the features of the set of features to form a feature group.

The computing device identifies features from the data by first identifying types of predictions that are output from the predictive model. For example, may not receive identification of what the predictive model predicts. The computing device identifies what the predictive model predicts through analysis of the data. If the data includes training data then the computing device may identify the types of predictions from the labels present in the training data. If the training data is unavailable, the types of predictions can be identified from the output of the predictive model. The computing device identifies a class that is the subject of the prediction generated by the predictive model. The computing device then identifies characteristics of the class from the data. The computing device defines a feature as being a discrete characteristic of the class.

The computing device defines a feature group from the set of features. A feature group includes one or more features and represents a subclass of the class. Members of the subclass include the characteristics that correspond to the one or more features. The computing device defines a feature group to detect a bias in the predictive model relative to the feature group. For instance, the computing device tests the predictive model to determine if a classification accuracy, classification rate, true positive rate, or the false positive rate of the feature group indicates a statically significant deviation from expected values.

In some instances, the computing devices defines multiple feature groups based on the size of the subclass that matches the features of the feature group. For instance, the computing device defines feature groups that each represent a subclass of a size that exceeds a first threshold but not a second threshold. This ensures that a feature group does not include so many features so as to only represent a subclass with a single member or that a feature group is so broad so as to include all members of the class. In other instances, the computing device generates feature groups based on predetermined quantity of features such as one, two, three, etc. The computing device defines a plurality of feature groups with each feature group including the predetermined quantity of features or less from the set of features. The plurality of feature groups may include feature groups of every combination features that meet that criteria. In some instances, the computing device receives user input identifying the feature group. In other instances, the computing device receives user input identifying one or more feature groups in addition to the feature group defined by the computing device.

At block 312, the computing device generates one or more performance metrics for the feature group and one or more baseline metrics. Each performance metric represents a measure of a type of bias associated with the feature group. Examples of performance metrics include, but are not limited to, classification accuracy with respect to the feature group, classification rate of a particular prediction associated with the feature group, true positive rate of a particular prediction associated with the feature group, or false positive rate of a particular prediction associated with the feature.

Each baseline metric of the one or more baseline metrics corresponds to a performance metric of the one or more performance metrics. The baseline metrics represent expected performance metrics. The computing device generates the one or more baseline metrics for the feature group based on other feature groups, the data, an expected performance of the model, user input, or the like. Alternatively, each of the one or more baseline metrics may be equal to the corresponding performance metric of the feature group's complement.

The computing device compares each of the one or more performance metrics with the corresponding baseline metrics. If the difference is statically significant (e.g., p-value less than 0.05), then a bias is detected for the feature group. For example, a classification rate bias indicates that the predictive model generates a particular prediction associated with the feature group disproportionally more or less than the feature group's complement.

At block 316, the computing device generates a graphical user interface for display that results of testing the predictive model. The graphical user interface includes two or more graphical objects. A first graphical object represents at least one of the one or more performance metrics. A second graphical object of the two or more graphical object represents the bias detected in the predictive model. The graphical user interface may represent other graphical objects such as, but not limited to, an overall performance of the predictive model, the baseline metrics for the feature group, performance metrics for other feature groups, other detected biases, characteristics of the predictive model, identification of a cause of the bias such as a portion of training data that caused the bias, or the like.

The graphical user interface provides a visual representation of the performance of the predictive model. The graphical user interface may display the performance characteristics of the predictive model side-by-side with expected performance characteristics or performance characteristics of similar predictive models to highlight deviations in model performance.

Figure 4:
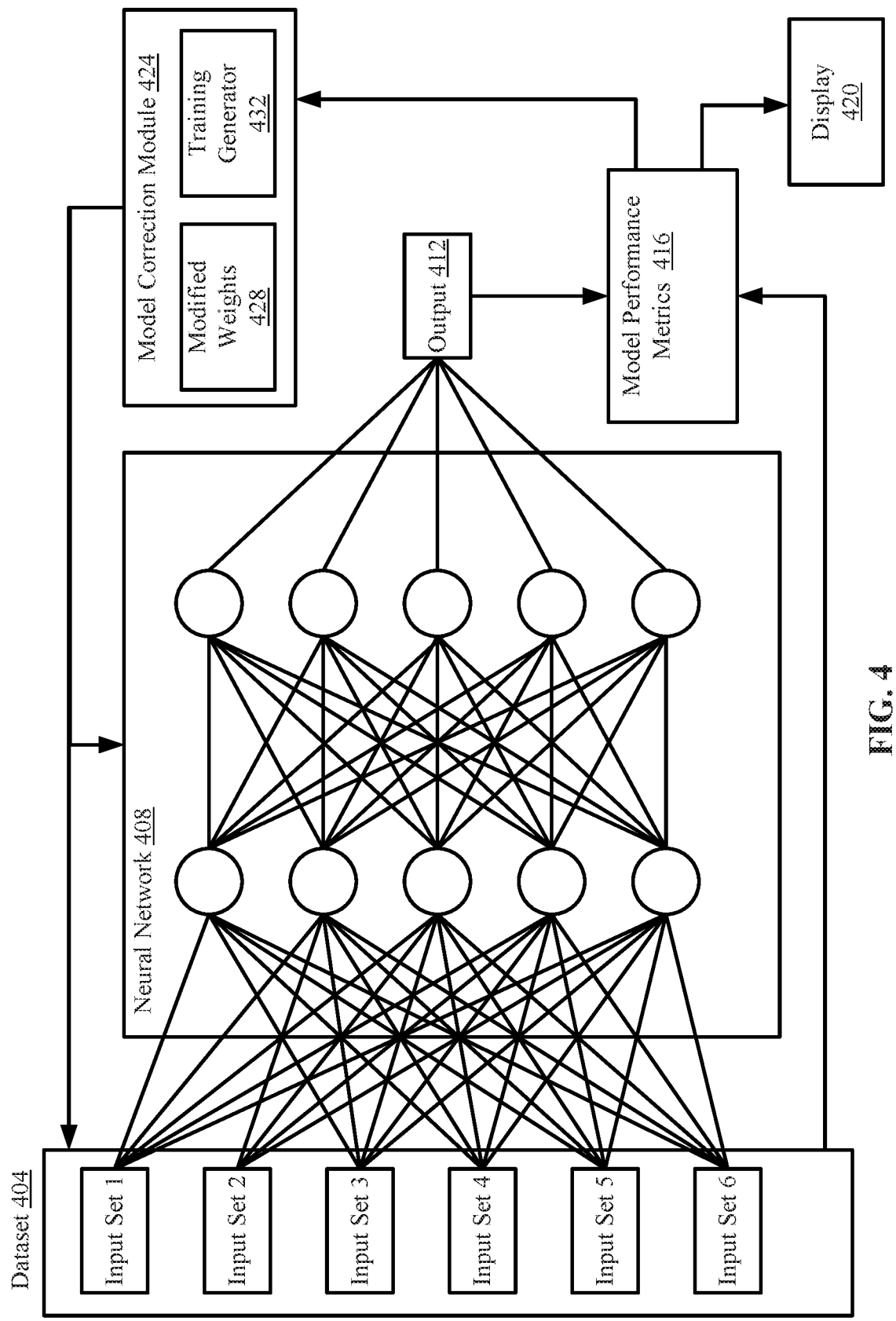
FIG. 4 depicts an example of detecting bias in an artificial neural network, according to certain embodiments of the present disclosure.

FIG. 4 depicts an example of detecting bias in an artificial neural network, according to certain embodiments of the present disclosure. Artificial neural networks process data using a plurality of interconnected processing nodes. Each node executes a different intermediate process such that each pathway through the neural network generates a different output. The nodes are connected by pathways that are assigned a weight. The weights increase or decrease the likelihood of the data being passed to a particular next node. For example, a dataset 404 includes a plurality of input datasets. Each input dataset is connected to each of a first layer of nodes of neural network 408. Each pathway is assigned weight that controls which node of the first layer of nodes is likely to receive the input set 1. In some instances, neural network uses a hyperparameter or a random number generator and the weights of each possible pathway to determine which pathway is selected. Similarly, each node of the first layer of nodes is connected to each of a second layer of node called a hidden layer. Weights assigned these pathways control which node of the hidden layer continues to processing the input data. Each node of the hidden layer outputs the prediction result to output 412.

The output 412 and the dataset 404 are used to generate model performance metrics 416 for the neural network 408. For instance, the model performance metrics include overall model performance such as classification accuracy and performance metrics associated with particular feature groups associated with predictions made by the neural network 408. The feature groups represent one or more characteristics of a class associated with the prediction generated by the neural network. The performance metrics are displayed by a display 420 and transmitted to a model correction module 424. The model correction module 424 generates a model correction usable to improve the performance metrics of the neural network such as, but not limited to, improving overall classification accuracy, reducing or eliminating biases, or the like.

The model correction module 424 determines whether the predictive model such as neural network 408 is capable of being modified directly. If the model can be modified directly, the model correction module 424 generates modified weights 428 usable to modify the model. For instance, neural network 408 may be configured to expose the values of pathway weights through an interface. The model correction module 424 identifies the pathways associated with classification errors and biases and modifies the pathways to increase or decrease the likelihood that data associated with the feature group with be processed by the nodes on those pathways.

Some models operate as black boxes in which little is known about how the data is processed with the model. It may not be possible to directly modify such models. Instead, the model correction module analysis the dataset 404 to determine a portion of dataset 404 that caused the classification error or bias. The model correction module 424 then generates a modification to the training data using training generator 432. The neural network 408 may be retrained using the modified training data to improve the classification accuracy and/or remove the bias.

The training generator 432 uses one or more parameters to procedurally generate additional training data. For instance, if a particular feature group is under-represented in the dataset 404, then the training generator 432 generates additional training data for the feature group to balance the feature group relative to other feature groups. The one or more parameters control the quantity and type of data generated by the training generator 432. For example, the one or more parameters indicate that the generated data is to correspond to a particular feature group and/or include a particular label. In some instances, the training generator 424 analyzes the dataset 404 to determine the structure of portions of dataset 404 that correspond to particular feature groups. The training generator then generates new data that includes a similar structure as the existing data such as the same data structures with different values. The values may be generated using a random number generator constrained by the known values in the dataset to prevent generating values that are too high or too low. In other instances, the training generator 424 copies portions of the dataset 404 rather than generate new data. In still yet other instances, the training generator 424 generates instructions that modify the dataset 404 in addition to or in place of generating additional training data.

The training generator 424 injects the additional training data or modification into datasets 404. The process may execute incrementally in which the model correction module continually modifies the dataset 404 and/or the neural network 408 until the model performance metrics 416 exceed a predetermined threshold or user input.

Figure 5:
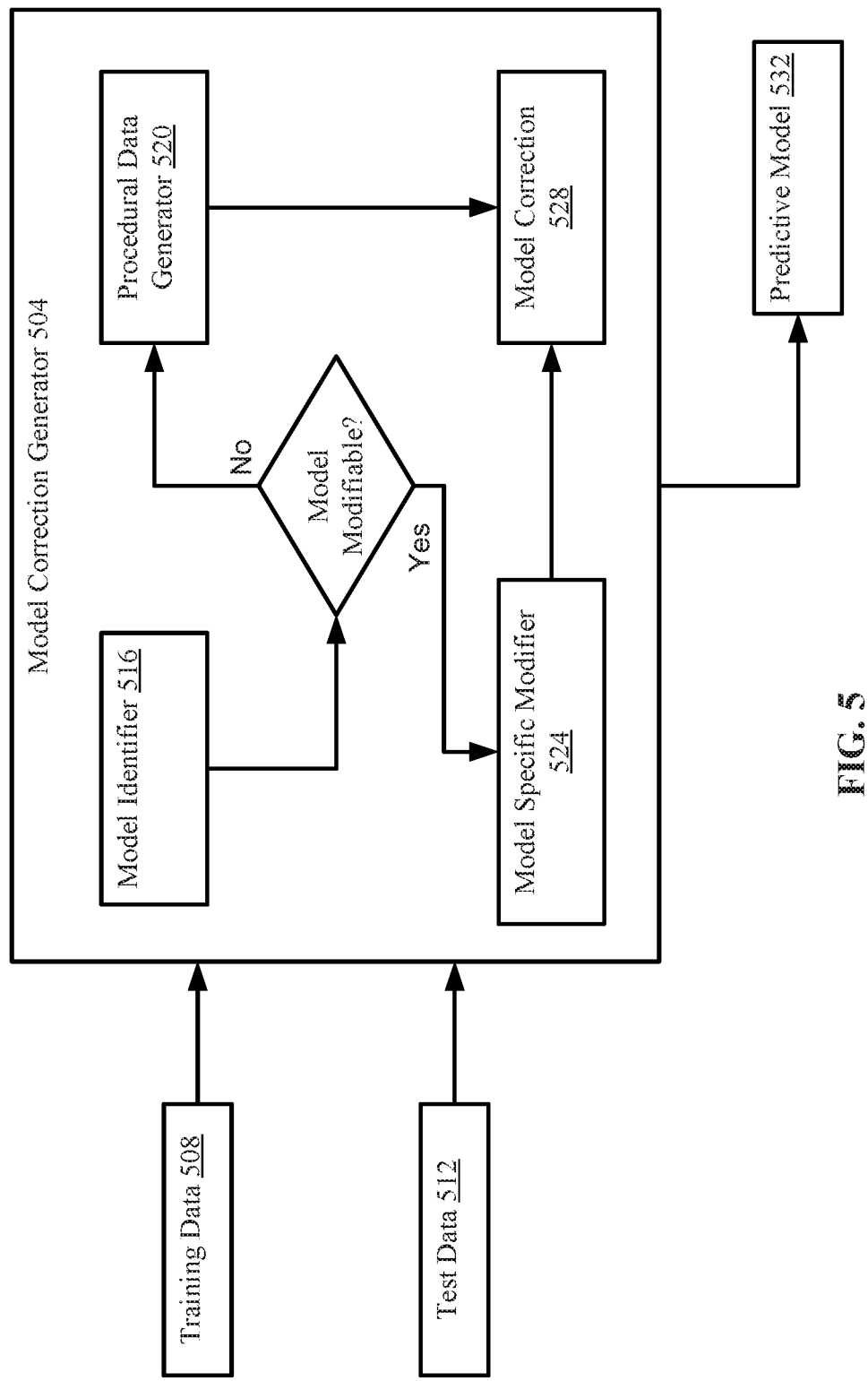
FIG. 5 depicts an example of a block diagram for generating model corrections that remove bias in predictive models, according to certain embodiments of the present disclosure.

FIG. 5 depicts an example of a block diagram for generating model corrections that remove bias in predictive models, according to certain embodiments of the present disclosure. A model correction generator 504 receives a request to generate a model correction for an instance of a predictive model. The request includes training data 508 and test data 512 from a test harness (e.g., set of software processes configured to automate testing of predictive models). The training data 508 corresponds to data used to train a particular instance of a predictive model 532. The test data 512 includes predictions generated by the predictive model 532 based on a given input. In some instances, the given input may be selected by the model correction generator 504 to generate a particular quantity and range of test data 512. In other instances, the given input may be input passed to the predictive model 532 during routine operations of the predictive model 532 at the client device.

The model correction generator 504 includes a model identifier 516, which uses the training data 508 or the test data 512 to identify a type of predictive model such as decision trees, artificial neural networks, logistic regression, k-nearest neighbor, support vector machines, and the like. For example, the model identifier 516 identifies metadata within the training data 508 or test data 512 that indicates a type of predictive model 532. Alternatively, the model identifier 516 may identify the type of predictive model using the structure of the training data 508, test data 512, or user input.

The model correction generator 504 determines whether the type of predictive model is modifiable directly or indirectly. For instance, some predictive models may include interfaces that expose various parameters of the predictive models to render the predictive model directly modifiable. Other predictive models may be opaque such that it may not be possible to determine how data is processed by the predictive model. Those models may not be directly modified, but instead indirectly modified such as through training data.

If the predictive model is modifiable, than a model specific modifier 524 generates a modification to the predictive model based on the type of predictive model. For instance, for decision trees, the model specific modifier 524 may add, remove, or alter nodes of the decision tree. For a neural network, the model specific modifier 524 generates weights that affect the traversal of particular pathways through the network. The adjustments of weights may be dependent on the cause of the bias such as over-representation or under-representation. In some instances, the model specific modifier 524 may continually pass a particular input into the predictive model while individual weights are being adjusted until a desired output is achieved or the bias is reduced or eliminated from the predictive model. The model correction generator 504 packages the modification to the predictive model into a model correction 528. The modification may include instructions for a client device to modify the predictive model or an instructions that automatically modifies the predictive model.

If the predictive model is not directly modifiable, the predictive model may be modified indirectly by generating a modification to the training data 508 of the predictive model and triggering a retraining phase. The modification to the training data 508 can include, but is not limited to, a modification (such as alteration or deletion) to a particular portion of data of the training data 508 and/or generated data to be added to the training data 508. A procedural data generator 520 may receive an analysis of the cause of the bias such as a portion of training data. The procedural data generator 520 then generates a modification to the training data to reduce or eliminate the bias. For instance, if the bias is caused by over-representation of a feature group, then the procedural data generator 520 may modify or eliminate data contributing to the over-representation and/or generate additional data for the under-represented portions of the data.

The procedural data generator 520 generates the data algorithmically according to a set of parameters that indicate a quantity of data to be generates, a type of data to be generated, labels to be generated, feature groups associated with the generated data, combinations thereof, or the like. Since the data is generated procedurally, the model correction generator 504 does not have to store all of the possible variations of the data that may be needed to correct for a given bias in the training data 508. Once the parameters are set, the procedural data generator 520 begins generating pseudo randomized data that matches the criteria set by the parameters. Alternatively, or additionally, some or all of the data may be retrieved from a training database such as database that stores data used to training different types of predictive models. The model correction generator 504 packages the modification to the training data 508 in a model correction 528. The model correction includes instructions for a client device to modify the training data 508 and retrain the predictive model. Alternatively, the model correction 528 includes a seed that enables the client device to procedurally generate the modifications to the training data to reduce the bandwidth needed to transmit the model correction.

The model correction generator 504 transmits the model correction 528 to the predictive model 532. The model correction 528 executes to modify the predictive model 532 either directly or indirectly to reduce or eliminate the detected biases in the predictive model.

Figure 6:
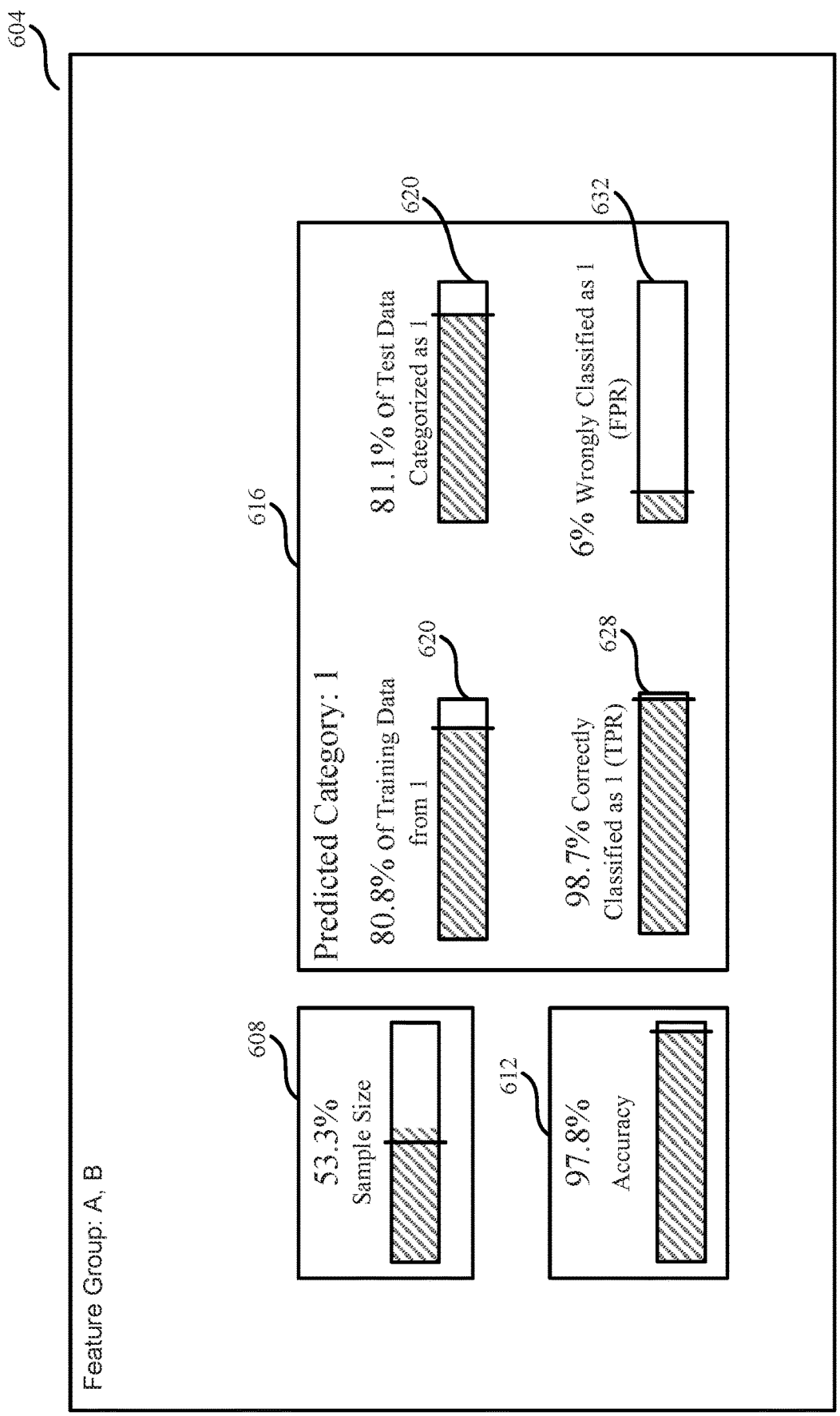
FIG. 6 depicts an example of a graphical user interface presenting bias analysis data, according to certain embodiments of the present disclosure.

FIG. 6 depicts an example of a graphical user interface presenting bias analysis data, according to certain embodiments of the present disclosure. A bias detection system generates a graphical user interface to visually represent the biases in a predictive model. The graphical user interface includes a first panel 604 that indicates a current feature group that is being depicted. The first panel identifies the feature group including feature A and feature B. The feature group defines a subclass whose members exhibit characteristics represented by feature A and characteristics represented by feature B.

The graphical user interface includes a first subpanel 608 that provides the sample size value for the feature group. The sample size value indicates the portion of the training data that corresponds to the feature group. The subpanel 608 represents the sample size as both a percentage of the whole sample and as a graph. In some instances, the sample size may be represented as just a percentage or as just a graph. In other instances, the sample size may be represented using other values such as an alphanumeric rank or the like. The graph may be any time of graph that represents the relative amount of the sample size associated with the feature as compared to the entire sample.

A second subpanel 612 indicates the overall accuracy of the predictive model in generating predictions. A third subpanel 616 represents four performance metrics associated with a particular prediction associated with the feature group. Returning to the employee evaluation example, a feature group of Asian males has three possible three possible predictions: below expectations, meets expectations, exceeds expectations. The subpanel 616 displays four performance metrics associated with the meets expectation prediction. The four performance metrics indicate the classification accuracy 620, classification rate 624, true positive rate 628, and false positive rate 632 for Asian males predicted to meet expectations.

The first panel 604 may include one or more additional subpanels for display near or side-by-side to subpanels 608-616. For instance, the one or more additional subpanels may present other predictions associated with the feature group such as below expectations or exceeds expectations. The panel 604 and subpanels 608-616 can be manipulated through user input. For instance, the user input can cause panels or subpanels to be rearranged, change the color or size of the panels, subpanels, or graphs within subpanels, change that represented by a panel or subpanel, add or remove performance metrics or baseline metrics, add or remove features in the feature group, compare performance metrics from multiple feature groups or the like.

Figure 7:
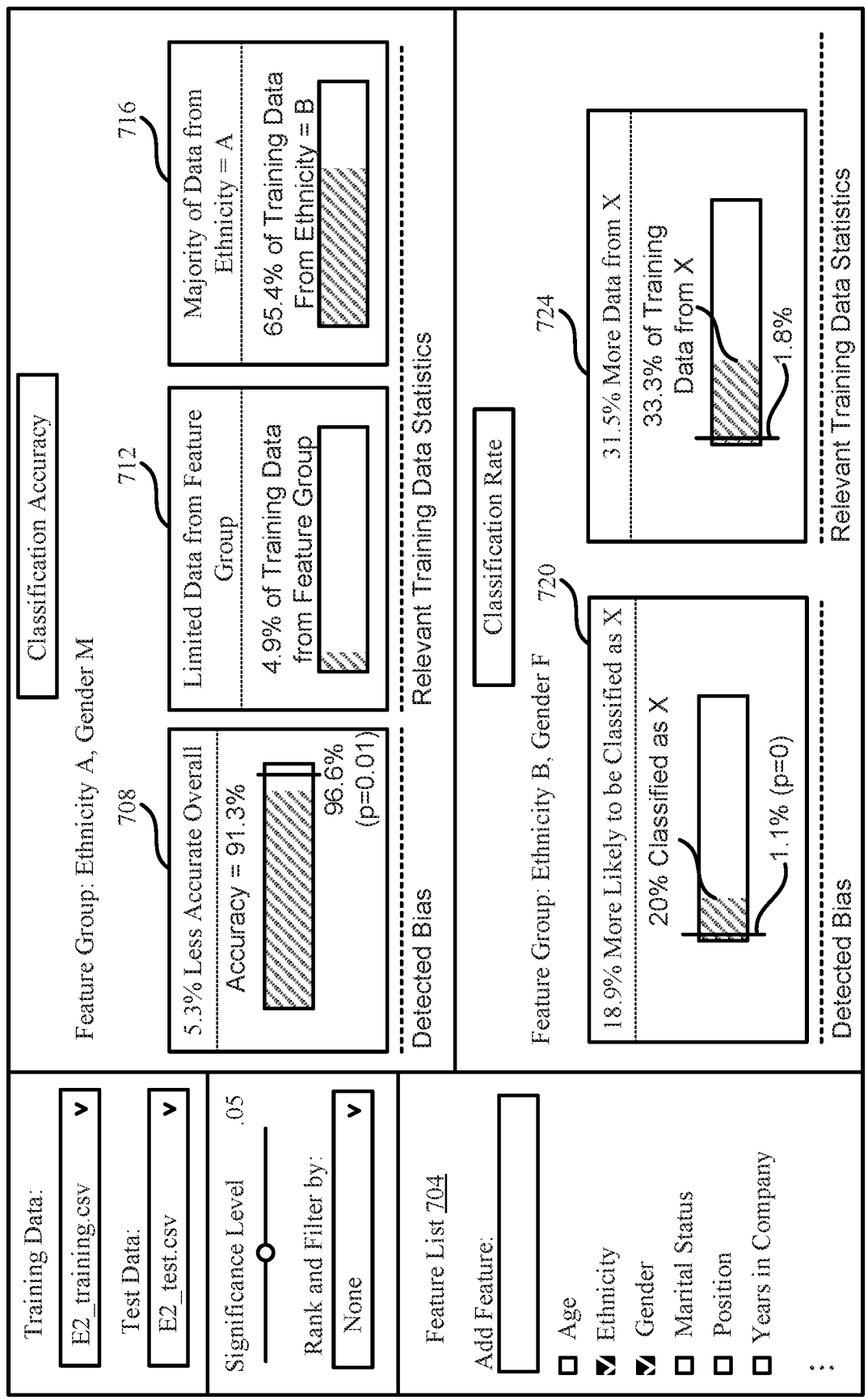
FIG. 7 depicts an example of a graphical user interface presenting dynamically selected bias analysis data, according to certain embodiments of the present disclosure.

FIG. 7 depicts an example of a graphical user interface presenting dynamically selected bias analysis data, according to certain embodiments of the present disclosure. A bias detection system generates a graphical user interface that enables user interaction to visually represent biases in a predictive model. The graphical user interface includes a panel with one or more frames. Each frame enables user interaction to alter the representation of another frame or provides a representation of biases in a predictive model. The graphical user interface depicted in FIG. 7 includes three frames on the left portion of the panel. The frames receive user input that controls the representation of biases (in the frames to the right). Examples of user input include, but are not limited to, selection of training data and/or test data, selection of the threshold for statistical significance, selection of filters, selection of ranking criteria, selection of feature types from a feature list 704, and the like. Any aspect of the representation of the of the biases may be configured through user input.

For example, the bias detection system receives user input selecting one or more feature types from a feature list 704. The feature list 704 presents a set of feature types identified through analysis of the test data and/or training data. The feature list 704 also includes a text box for receiving user input of additional feature types that are not in the set of feature types. The text box may be a drop down menu with enumerated feature types or the text box may receive textual input (e.g., alphanumeric characters) that define a feature type. Once a feature type is added, the new feature type will appear with the other feature types of the set of feature types. User input selecting a feature type causes a checkmark to appear in the box adjacent to the feature type to indicate that the feature type has been selected. Any other mechanism may be used to indicate that a feature type has been selected such as, but not limited to, highlighting the feature type, removing the feature type, removing feature types that have not been selected, an audible alert, or the like.

As shown in FIG. 7, the bias detection system receives user input selecting two feature types from the feature list 704: ethnicity and gender. The bias detection system identifies feature groups that correspond to the selected feature types then detects biases associated with those feature groups. For example, as shown, the bias detection system identifies a feature group of ethnicity A and gender B that correspond to the selected feature types of ethnicity and gender. The bias detection system the detects a bias in that feature group that corresponds a classification accuracy bias. Block 708 indicates this feature group is 5.3% less accurate than the compliment of the feature group (e.g., ethnicity not A and gender B). Block 708 provides a representation of the accuracy of the feature group (e.g., 91.3%) with a representation of the accuracy of complement of the feature group (e.g., 96.6%) to represent the severity of the bias.

Block 712 and 716 provide an indication of portions of the training data that may be responsible for the bias represented by block 708. For instance, block 712 indicates that a possible cause of the bias may be due to the limited quantity of training data that corresponds to the feature group. As shown, 4.9% of the training data corresponds to the feature group. Block 716 represents the ethnicity that corresponds to the largest portion of the training data to contrast with the data represented by block 712. Together blocks 712 and 716 indicate that the cause of the classification accuracy bias is likely due the predictive model being improperly trained with too little training data corresponding to the feature group.

The frame also indicates that the predictive model includes a classification rate bias with respect to another feature group (e.g., ethnicity B and gender F) that corresponds the selected feature types. Block 720 represents the detected classification rate bias indicating that the feature group is 18.9% more likely to receive a particular prediction X. Block 720 provides a representation of the classification rate of the feature group for a particular prediction (e.g., 20%) and the classification rate of the complement of the feature group (e.g., 1.1%). Block 724 provides a representation of likely cause of the classification rate bias. For instance, block 724 indicates that 31.5% more training data corresponds to prediction X (for the feature group) than for other predictions. Block 724 also represents the percentage of training data that corresponds to prediction X (e.g., 33.3%) and the percentage of training data that corresponds to other predictions (e.g., 1.8%) for the feature group. The frame may show all feature groups that correspond to the selected feature types that are associated with a bias as well as a portion of the training data that corresponds to a cause of the bias.

The graphical user interfaces of FIG. 6 and FIG. 7 provide an example of representations data analysis by a bias detection system. The data represented in each graphical user interfaces are mere examples of the types of data analysis performed by the bias detection system. Further, the representations of the data (e.g., each panel, block, graph, etc.) may be represented as shown or in any other manner in which the information may be presented to a user without departing from the spirit or the scope of the present disclosure.

Figure 8:
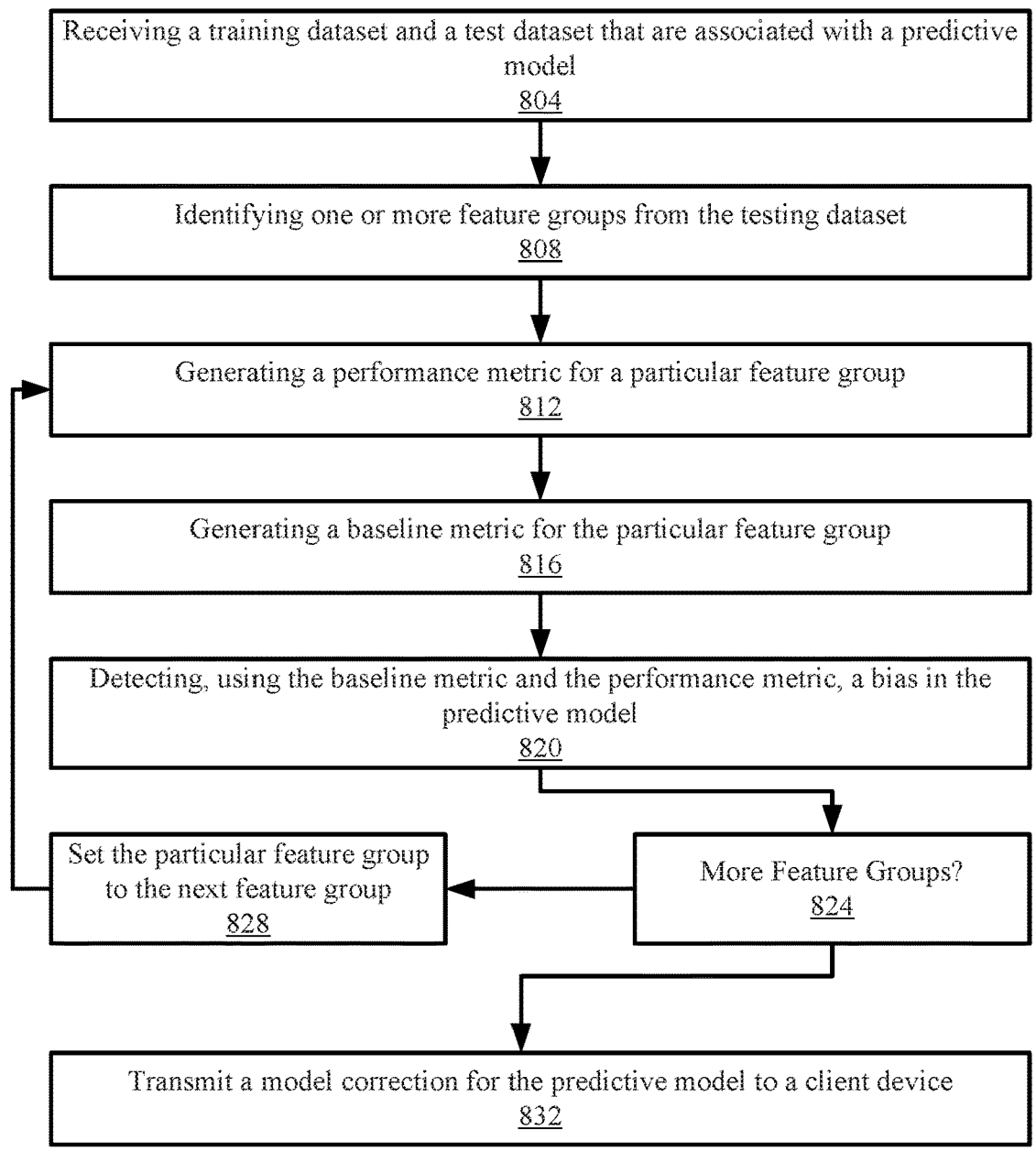
FIG. 8 depicts an example of a process for testing predictive models, according to certain embodiments of the present disclosure.

FIG. 8 depicts an example of a process for testing predictive models, according to certain embodiments of the present disclosure. The process begins at block 804 in which a computing device receives a training dataset and a test dataset. The training dataset includes data that trained the predictive model. The test dataset includes prediction from the predictive model from given input. In some instances, the test dataset includes the given input in addition to the prediction. The test data can include data associated with the predictive model such as, identification of a type of predictive model, characteristics of the predictive model, information about the training phase of the predictive model, total number of predictions, combinations thereof, and the like.

At block 808, the computing device identifies one or more feature groups using the training dataset and the test dataset. Each feature of the feature groups corresponds to a characteristics of a member of a class about which predictions are made. The computing device identifies feature groups by first identifying a set of features. The computing device identifies features from the training dataset and the test dataset by identifying types of predictions that are output from the predictive model. For example, predictive model was trained using supervised learning, then the computing device can obtain a list of prediction from the labels within the training dataset. If the training dataset is unavailable or lacks labels, the computing device identifies types of predictions from the output of the predictive model. Then, the computing device identifies a class associated with the types of predictions and identifies features from characteristics of the class. The computing device defines a feature group from the set of features. A feature group includes one or more features.

In some instances, the computing devices defines multiple feature groups based on the size of the subclass that matches the features of the feature group. For instance, the computing device defines feature groups that each represent a subclass of a size that exceeds a first threshold but not a second threshold. This ensures that a feature group does not include so many features so as to only represent a subclass with a single member or that a feature group is so broad so as to include all members of the class. The computing device automatically identifies the one or more feature groups from the training dataset and the test dataset. One or more additional feature groups may be identified from user input. In some instances, all of the features are identified from user input.

At block 812, the computing device generates one or more performance metrics for a first feature group. Each performance metric represents a measure of a type of bias associated with the feature group and a particular prediction. Examples of performance metrics include, but are not limited to, classification accuracy with respect to the feature group, classification rate of a particular prediction associated with the feature group, true positive rate of a particular prediction associated with the feature group, or false positive rate of a particular prediction associated with the feature.

At block 816, the computing device generates one or more baseline metrics first feature group. Each baseline metric of the one or more baseline metrics corresponds to a performance metric of the one or more performance metrics. The baseline metrics represent expected performance metrics of the feature group with respect to a particular prediction. The baseline feature group may be based on the performance metrics associated with one or more other feature groups. For instance, the baseline metrics for a particular feature correspond to the performance metrics of the complement of the particular feature group.

At block 820, the computing device determines whether a bias exists in the predictive model associated with the first feature group. The computing device detects the bias by determining the difference between each performance metric of the first feature group and the baseline metrics. If the difference is statically significant (e.g., p-value less than 0.05), then a bias is detected for the feature group. The threshold value to determine statistical significance may be predetermined, dynamically determined, or identified by user input.

At block 824, the computing device determines if there is another feature group to test for a bias. If there is another feature group, control passes to block 828 in which the next the first feature groups is set to the next feature group and the process returns to 812, The processes of blocks 812-828 continue to repeat until all feature groups are processed.

If there are no feature groups to process, the process continues at block 832 where the computing device generates and transmits a model correction to a client device. The model correction is usable to reduce or eliminate the detected bias in the predictive model. The model correction may include instructions for directing the client device to modify the predictive model directly or the training data associated with the predictive model, instructions that automatically modify the predictive model directly or the training data associated with the predictive model. In some instances, the model correction may be a representation of the bias and/or the portion of the training data responsible for the bias. For example, the model correction may be some or all of the graphical user interfaces described in connection with FIG. 6 and FIG. 7. Once the model correction is transmitted to the client device the process may terminate. Alternatively, the process may return to block 804 to determine if the model correction reduces or eliminates the bias in the predictive model or to determine if the model correction introduces a new bias. Alternatively, the process may return to block 804 in which the computing device waits for another training dataset and test dataset to be received. Upon receiving the new training dataset and test dataset, the process of blocks 804-832 repeat.

Figure 9:
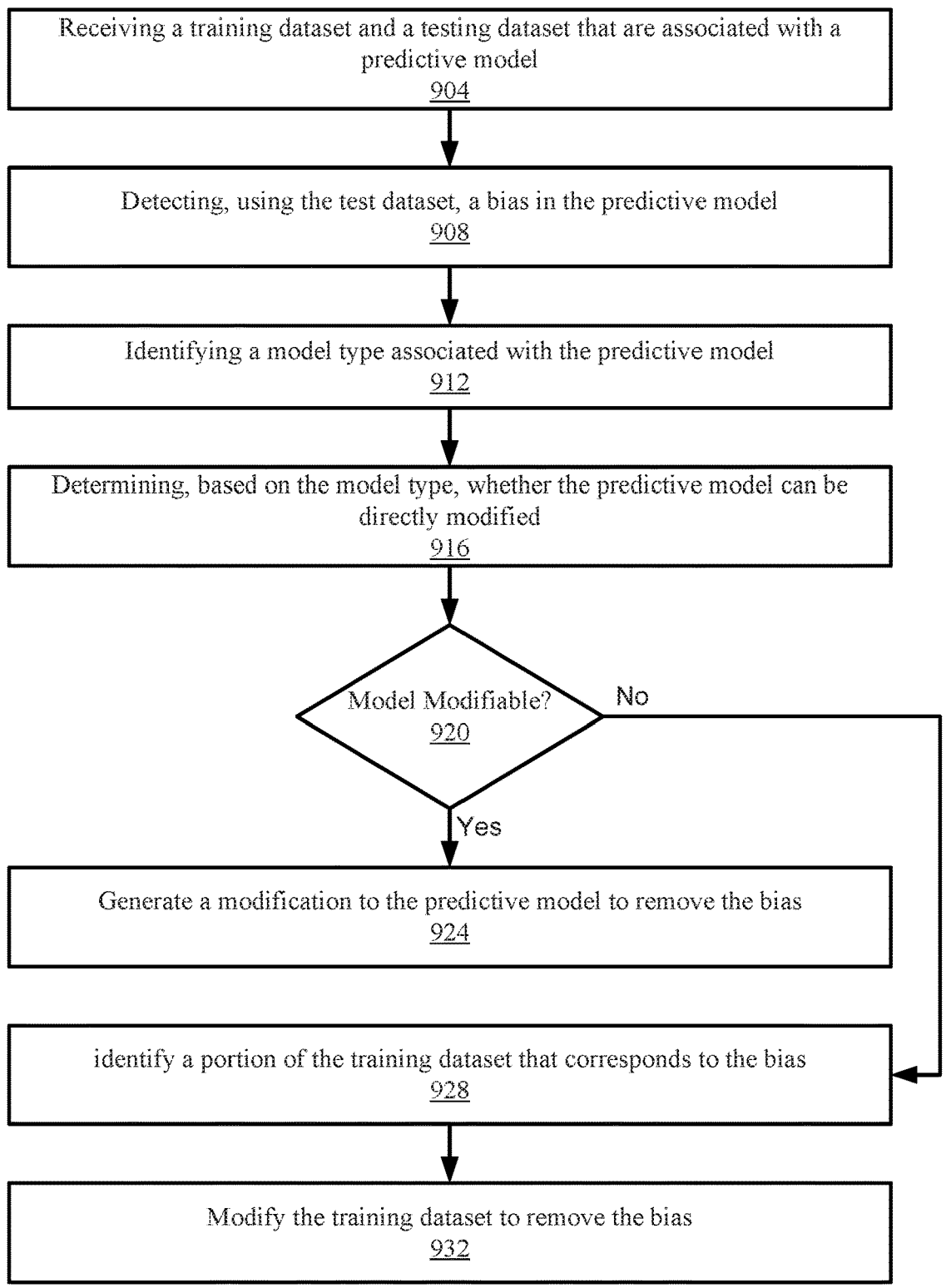
FIG. 9 depicts an example of a process for modifying predictive models to remove detected bias, according to certain embodiments of the present disclosure.

FIG. 9 depicts an example of a process for modifying predictive models to remove detected bias, according to certain embodiments of the present disclosure. At block 904 a computing device receives a training dataset and a test dataset. The training dataset includes data that trained the predictive model. The test dataset includes prediction from the predictive model from given input. In some instances, the test dataset includes the given input in addition to the prediction. The test data can include data associated with the predictive model such as, identification of a type of predictive model, characteristics of the predictive model, information about the training phase of the predictive model, total number of predictions, combinations thereof, and the like.

At block 908, the computing device detects a bias in the predictive model with respect to a particular feature group. The computing device first identifies one or more feature groups from the training dataset and the test dataset. Each feature corresponds to a characteristics of a member of a class about which predictions are made.

The computing device enumerates a set of features through an analysis of the types of predictions that are output from the predictive model. The computing device identifies the types of predictions generated by the predictive model from labels in the training data. If the training data lacks labels (e.g., such as when unsupervised learning), the types of predictions can be identified from the output of the predictive model alone. The computing device identifies a class associated with the types of predictions. The computing device then identifies characteristics of the class in the training dataset and the test dataset with a feature being a discrete characteristic of the class. The computing device defines a feature group from the set of features. A feature group includes one or more features and represents a subclass of the class.

The computing device generates, for each feature group, one or more performance metrics and one or more baseline metrics. Each performance metric represents a measure of a type of bias associated with the feature group. Examples of performance metrics include, but are not limited to, classification accuracy with respect to the feature group, classification rate of a particular prediction associated with the feature group, true positive rate of a particular prediction associated with the feature group, or false positive rate of a particular prediction associated with the feature.

Each baseline metric of the one or more baseline metrics corresponds to a performance metric of the one or more performance metrics. The baseline metrics represent expected performance metrics. For example, for each feature group, each of the one or more baseline metrics may be equal to a corresponding performance metric of the feature group's complement.

The computing device compares each of the one or more performance metrics with the corresponding baseline metrics. If the difference is statically significant (e.g., p-value less than 0.05), then a bias is detected for the feature group. For example, a classification rate bias indicates that the predictive model generates a particular prediction associated with the feature group disproportionally more or less than the feature group's complement.

The computing device determines a potential cause of the detected bias by generating, for each feature group, a sample size of the feature group (e.g., volume of training data that corresponds to the feature group) and one or more proportion labels (e.g., proportion of the feature group with a label that corresponds to a particular prediction). For each feature group, the computing device determines a sample size value and a value for each prediction type that indicates the proportion of the subclass that includes a label of that prediction type.

The computing device determines, from the sample size value and the proportion of each label, that the cause of the bias corresponds to an under-representation of training data associated with the feature group, an over-representation of training data associated with the feature group, or a pre-existing prejudice. For example, low classification accuracy for a feature group may be due to a small sample size associated with the feature group (e.g., under-representation) or due to other feature groups that have a disproportionately larger sample size (e.g., over-representation in other feature groups). In another example, a model can learn from prejudice present in the training data such as a high rate of a particular prediction for members of a subclass may be due to the training data including more labels for the particular prediction than for other predictions.

At block 912, the computing device determines the identification of a predictive model type. The computing device generates a correction to the predictive model based on the predictive model type. For example, the computing device generates a different correction for artificial neural network than for logistic regression type models. The computing device determines the identification of the model type using the training dataset or the test dataset. For example, the training dataset or the test dataset can include metadata that provide information about the predictive model include the model type. Alternatively, the computing device may determine the predictive model type from an analysis of the structure of the training dataset or the test dataset.

At block 916, the computing device determines whether the type of predictive model is modifiable directly or indirectly. Some predictive model may include interfaces that expose various parameters of the predictive models to render the predictive model directly modifiable. Other predictive models may be opaque such that it may not be possible to determine how data is processed by the predictive model. Those models may not be directly modified, but instead indirectly modified such as through training data.

If the predictive model type is modifiable, the process continues to 920 where the computing device generates a model correction usable to directly modify the predictive to reduce or eliminate the bias. The type of modification may be based on the predictive model type. For instance, for decision trees, the modification can include adding, removing, or altering nodes of the decision tree. For a neural network, the computing device generates weights that affect the traversal of particular pathways through the network. The modification to the predictive model is also based on the potential cause of the bias. If the cause of bias corresponds to an over-representation of the feature group, then the modification to a neural network may include modifications to the weights of neural pathways associated with the biased feature group to reduce to classification rate of the feature group.

If the predictive model is not directly modifiable, the process continues to block 928, where the computing device identifies a portion of the training data that corresponds to the detected bias. For example, the computing device analysis the training data marks portion of the training data that corresponds to the feature group and the complement of the feature group.

At block 932, the computing device generate modification to the training dataset to remove the bias. The modification includes generating additional training data (e.g., using procedural data generator), removing training data, or modifying training data. The selected modification may be based on the cause of the bias. For example, if the cause of the bias is over-representation of the feature group, the modification can include removal of some of the training corresponding to the feature group or generating additional data for other feature groups. If the cause of the bias is under-representation of the feature group, then the modification can include generating additional data for the feature group.

The procedural data generator uses one or more parameters to automatically generate large quantities of training data. The parameters can include, but are not limited to, particular labels, feature groups, predictions, an amount of data to generate, or the like. The computing device may identify one or more data structure common to feature groups in the training data. The procedural data generator then uses a random number generator to pseudo randomly populate the fields of the data structures. The procedurally generated data includes that same structure as the original data with different fields. Once the modification is applied to the training dataset, the predictive model may be retrained using the modified training dataset.

Once the predictive model is modified the process may terminate. Alternatively, the process may return to block 904 to determine if the modification reduces or eliminates the bias in the predictive model or to determine if the modification introduces a new bias. Alternatively, the process may return to block 904 in which the computing device waits for another training dataset and test dataset to be received. Upon receiving the new training dataset and test dataset the process of blocks 904-932 repeat.

The blocks of FIGS. 3, 8, and 9 though presented in a particular order, may be executed in any particular order and each block may be executed one or more times before moving on to the next block.

The description of examples relating employee performance predictions are intended to provide examples and context for various aspects of the disclosure. The disclosure is not intended to be limited to employee performance predictions. Detecting and isolating bias in predictive models can readily applied to any predictive model.

Example of a Computing System for Implementing Certain Embodiments

Figure 10:
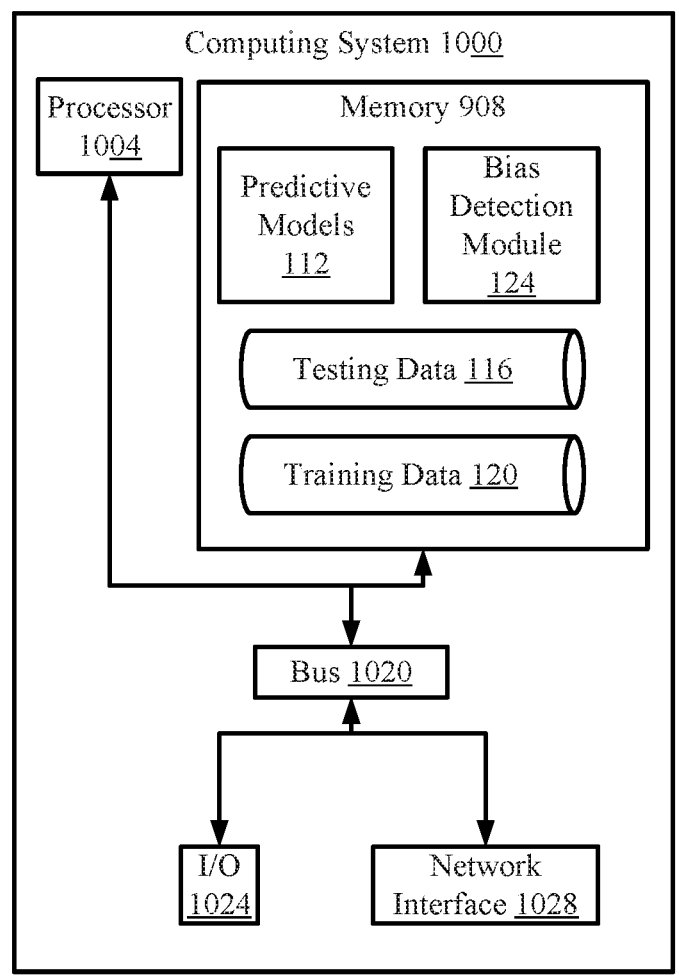
FIG. 10 depicts an example of a computing system that performs certain operations described herein, according to certain embodiments of the present disclosure.

Any suitable computing system or group of computing systems can be used for performing the operations described herein. For example, FIG. 10 depicts examples of computing system 1000 that operates as a digital display device such as a digital signage device. In some embodiments, the computing system 1000 includes bias detection module 124 for testing a predictive model for the presence of classification errors such as a bias with respect to a particular feature group. Computing system 1000 manages local storage databases that include predictive model data 112, test data 116 and training data 120. In some instances, the test data 116 and the training data 120 are stored in the same database. In other instances, the test data 116 and the training data 120 are stored in different databases in the same memory partition or within a different memory partition (or a different memory device).

The depicted example of a computing system 1000 includes a processor 1004 communicatively coupled to one or more memory devices 1008. The processor 1004 executes computer-executable program code stored in a memory device 1008, accesses information stored in the memory device 1008, or both. Examples of the processor 1004 include a microprocessor, an application-specific integrated circuit ("ASIC"), a field-programmable gate array ("FPGA"), or any other suitable processing device. The processor 1004 can include any number of processing devices, including a single processing device.

The memory device 1008 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 1000 may also include a number of external or internal devices, such as input or output devices. For example, the computing system 1000 is shown with one or more input/output ("I/O") interfaces 1024. An I/O interface 1024 can receive input from input devices or provide output to output devices. One or more buses 1012 are also included in the computing system 1000. The bus 1012 communicatively couples one or more components of a respective one of the computing system 1000.

The computing system 1000 executes program code that configures the processor 1102 to perform one or more of the operations described herein. The program code may be resident in the memory device 1008 or any suitable computer-readable medium and may be executed by the processor 1004 or any other suitable processor. In some embodiments, the program code can execute in a cloud environment where a portions of the program code are executed by multiple devices in parallel.

The computing system 1000 accesses testing data 116 and training data 120 in any suitable manner. In some embodiments, some or all of one or more of these datasets, models, and functions are stored in the memory device 1008, as in the example depicted in FIG. 10. For example, computing system 1000 executes bias detection module 124 using testing data 116 and training data 120 to test predictive model 112, all of which can occur within memory 1008.

The computing system 1000 includes a network interface device 1028. The network interface device 1028 includes any device or group of devices suitable for establishing a wired or wireless data connection to one or more data networks (e.g., a local area network or wide area network (wired or wireless using Bluetooth, ZigBee, Wi-Fi, or the like), a cellular network, combinations thereof, or the like). Non-limiting examples of the network interface device 1028 include an Ethernet network adapter, a modem, and the like. The computing system 1000 is able to communicate with one or more other computing devices via a data network using the network interface device 1028.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method comprising:
   receiving, at a computing device, a training dataset used to train a predictive model and a testing dataset generated through execution of the predictive model;

identifying, from the testing dataset, feature groups, each feature group including attribute values that are a subject of predictions generated by the predictive model;

generating, using the testing dataset, a performance metric for a particular feature group of the feature groups, the performance metric including a frequency in which the predictive model generated a particular prediction associated with the particular feature group;

generating, from the testing dataset, a baseline dataset corresponds to the performance metric for a different feature group of the feature groups;

detecting, using the performance metric and the baseline dataset, a bias in the predictive model with respect to the particular feature group, the bias causing the predictive model to incorrectly process an input dataset;

identifying, in response to detecting the bias in the predictive model, a subset of the training dataset that is correlated with the bias in the predictive model; and transmitting, to a client device, a model correction that modifies the predictive model with respect to the particular feature group.

2. The method of claim 1, wherein detecting the bias in the predictive model includes:
generating a p-value that corresponds to a difference between the performance metric and the baseline dataset; and
determining that the p-value is less than a threshold value.

3. The method of claim 1, wherein the different feature group is a complement of the particular feature group.

4. The method of claim 1, wherein the performance metric includes an indication of a false positive rate of the predictive model with respect to the particular feature group.

5. The method of claim 1, wherein model correction identifies a cause of the bias.

6. The method of claim 1, wherein the model correction includes procedurally generated training data that compensates for an over-representation or under-representation of the particular feature group in the training dataset.

7. The method of claim 1, further comprising:
receiving user input corresponding to a new feature group; and
generating a graphical user interface for display by the client device that includes a representation of a performance metric for the new feature group and an identification of a subset of the training dataset that corresponds to the new feature group.

8. A system comprising:
one or more processors; and
a non-transitory computer-readable storage medium storing instructions that when executed by the one or more processors, cause the one or more processors to perform operations including:
receiving, at a computing device, data associated with an operation of a predictive model at a client device;
identifying, from the data, a feature group that includes attribute values that are a subject of predictions generated by the predictive model;
generating, using the data, a performance metric for the feature group, the performance metric indicating an accuracy of the predictive model in predicting a label associated with the feature group;
generating, from the data, a baseline dataset for the feature group;
detecting, using the performance metric and the baseline dataset, a bias in the predictive model with respect to the feature group; and generating a graphical user interface for display by the client device, the graphical user interface including a first object representing the performance metric and a second object representing a bias in the predictive model.

9. The system of claim 8, wherein detecting the bias in the predictive model includes:
generating a p-value that corresponds to a difference between the performance metric and the baseline dataset; and
determining that the p-value is less than a threshold value.

10. The system of claim 8, wherein the operations further include:
generating a model correction that includes a modification to a training dataset to generate a modified training dataset, the training dataset corresponding to data that was used to train the predictive model; and
executing a subsequent training of the predictive model using the modified training dataset.

11. The system of claim 8, wherein the performance metric includes an indication of a false positive rate of the predictive model with respect to the feature group.

12. The system of claim 8, wherein the graphical user interface includes a third object that represents a potential cause of the bias.

13. The system of claim 8, wherein the graphical user interface includes a third object that represents a modification to the predictive model usable to reduce the bias.

14. The system of claim 8, wherein the operations further include:
receiving user input identifying a new feature group; and
generating a third object for representation by the graphical user interface, the third object including a representation of the performance metric for the new feature group.

15. A non-transitory computer-readable storage medium storing instructions that when executed by one or more processors, cause the one or more processors to perform operations including:
receiving, at a computing device, data associated with an operation of a predictive model at a client device;
identifying, from the data, a feature group that includes attribute values that are a subject of predictions generated by the predictive model;
generating, using the data, a performance metric for the feature group, the performance metric indicating an accuracy of the predictive model in predicting a label associated with the feature group;
generating, from the data, a baseline dataset for the feature group;
detecting, using the performance metric and the baseline dataset, a bias in the predictive model with respect to the feature group; and
generating a graphical user interface for display by the client device, the graphical user interface including a first object representing the performance metric and a second object representing a bias in the predictive model.

16. The non-transitory computer-readable storage medium of claim 15, wherein detecting the bias in the predictive model includes:
generating a p-value that corresponds to a difference between the performance metric and the baseline dataset; and
determining that the p-value is less than a threshold value.

17. The non-transitory computer-readable storage medium of claim 15, wherein the operations further include:

generating a model correction that includes a modification to a training dataset to generate a modified training dataset, the training dataset corresponding to data that was used to train the predictive model; and executing a subsequent training of the predictive model using the modified training dataset.

18. The non-transitory computer-readable storage medium of claim 15, wherein the performance metric includes an indication of a false positive rate of the predictive model with respect to the feature group.

19. The non-transitory computer-readable storage medium of claim 15, wherein the graphical user interface includes a third object that represents a modification to the predictive model usable to reduce the bias.

20. The non-transitory computer-readable storage medium of claim 15, wherein the graphical user interface includes a third object that represents a potential cause of the bias.

\* \* \* \* \*